US011818287B2

(12) United States Patent
Hefetz et al.

(10) Patent No.: US 11,818,287 B2
(45) Date of Patent: *Nov. 14, 2023

(54) METHOD AND SYSTEM FOR MONITORING AND VALIDATING ELECTRONIC TRANSACTIONS

(71) Applicant: Spriv LLC, New York, NY (US)

(72) Inventors: Guy Hefetz, Boca Raton, FL (US); Jacob Heffez, Holon (IL); Christopher Donald Wood, Arlington, VA (US)

(73) Assignee: Spriv LLC, New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/592,528

(22) Filed: Feb. 4, 2022

(65) Prior Publication Data

US 2022/0294894 A1     Sep. 15, 2022

Related U.S. Application Data

(63) Continuation-in-part of application No. 16/724,361, filed on Dec. 22, 2019, now Pat. No. 11,308,477,
(Continued)

(51) Int. Cl.
*G06K 5/00* (2006.01)
*H04M 1/72457* (2021.01)
(Continued)

(52) U.S. Cl.
CPC ....... *H04M 1/72457* (2021.01); *H04M 1/725* (2013.01); *H04W 4/029* (2018.02)

(58) Field of Classification Search
CPC ..... G06Q 20/20; G07G 1/0036; G07G 1/0081
(Continued)

(56) References Cited

U.S. PATENT DOCUMENTS

| 5,327,144 A | 7/1994 | Stilp et al. |
| 5,335,278 A | 8/1994 | Matchett et al. |

(Continued)

FOREIGN PATENT DOCUMENTS

| EP | 1459365 A2 | 9/2004 |
| EP | 1469368 A1 | 10/2004 |

(Continued)

OTHER PUBLICATIONS

Chen et al., "Cache Management Techniques for Privacy Preserving Location-based Services" Proceedings of the Ninth International Conference on Mobile Data Management Workshops, MDMW, pp. 88-96, Beijing, China, Apr. 2008.

(Continued)

*Primary Examiner* — Daniel St Cyr
(74) *Attorney, Agent, or Firm* — Cittone Demers & Arneri LLP; James P. Demers

(57) ABSTRACT

A computer system configured to authenticate the identity of a user who is attempting to access a website or conduct a transaction is provided. The system is configured to receive a geographical location associated with the user and to receive the geographical location of a mobile phone associated with the user, and to determine whether the two geographical locations are within an acceptable distance. The system is configured to take into account the accuracy of the mobile phone location.

20 Claims, 4 Drawing Sheets

Related U.S. Application Data which is a continuation-in-part of application No. 15/787,805, filed on Oct. 19, 2017, now Pat. No. 10,521,786.

(51) Int. Cl.
*H04W 4/029* (2018.01)
*H04M 1/725* (2021.01)

(58) Field of Classification Search
USPC ...... 235/382, 380, 383; 726/2–5; 705/64, 67
See application file for complete search history.

(56) References Cited

U.S. PATENT DOCUMENTS

| | | | |
|---|---|---|---|
| 5,365,451 | A | 11/1994 | Wang et al. |
| 5,535,431 | A | 7/1996 | Grube et al. |
| 5,754,657 | A | 5/1998 | Schipper et al. |
| 5,757,916 | A | 5/1998 | MacDoran |
| 5,790,074 | A | 8/1998 | Rangedahl et al. |
| 5,945,944 | A | 8/1999 | Krasner |
| 6,012,144 | A | 1/2000 | Pickett |
| 6,097,938 | A | 8/2000 | Paxson |
| 6,236,365 | B1 | 5/2001 | LeBlanc et al. |
| 6,466,779 | B1 | 10/2002 | Moles et al. |
| 6,612,488 | B2* | 9/2003 | Suzuki ............... G06Q 20/02 235/382 |
| 6,625,456 | B1 | 9/2003 | Busso et al. |
| 6,771,969 | B1 | 8/2004 | Chinoy |
| 6,882,313 | B1 | 4/2005 | Fan et al. |
| 6,975,941 | B1* | 12/2005 | Lau ............... G01C 21/3415 340/988 |
| 6,978,023 | B2 | 12/2005 | Dacosta |
| 7,013,149 | B2 | 3/2006 | Vetro et al. |
| 7,080,402 | B2 | 7/2006 | Bates |
| 7,212,806 | B2 | 5/2007 | Karaoguz |
| 7,305,245 | B2 | 12/2007 | Alizadeh-Shabdiz et al. |
| 7,321,775 | B2 | 1/2008 | Maanoja |
| 7,376,431 | B2 | 5/2008 | Niedermeyer |
| 7,418,267 | B2 | 8/2008 | Karaoguz |
| 7,450,930 | B2 | 11/2008 | Williams et al. |
| 7,497,374 | B2 | 3/2009 | Helsper et al. |
| 7,503,489 | B2 | 3/2009 | Heffez et al. |
| 7,577,665 | B2 | 8/2009 | Ramer et al. |
| 7,591,020 | B2 | 9/2009 | Kammer et al. |
| 7,594,605 | B2 | 9/2009 | Aaron et al. |
| 7,598,855 | B2 | 10/2009 | Scalisi et al. |
| 7,647,164 | B2 | 1/2010 | Reevs |
| 7,669,759 | B1 | 3/2010 | Zettner |
| 7,673,032 | B1 | 3/2010 | Augart |
| 7,673,793 | B2 | 3/2010 | Greene |
| 7,751,829 | B2 | 7/2010 | Masuoka et al. |
| 7,764,231 | B1 | 7/2010 | Karr et al. |
| 7,769,396 | B2 | 8/2010 | Alizadeh-Shabdiz et al. |
| 7,788,134 | B1 | 8/2010 | Manber et al. |
| 7,832,636 | B2 | 11/2010 | Heffez et al. |
| 7,848,760 | B2 | 12/2010 | Caspi et al. |
| 7,865,181 | B1 | 1/2011 | Macaluso |
| 7,907,529 | B2 | 3/2011 | Wisely et al. |
| 7,908,645 | B2 | 3/2011 | Varghese et al. |
| 8,006,190 | B2 | 8/2011 | Quoc et al. |
| 8,285,639 | B2 | 10/2012 | Eden et al. |
| 8,295,898 | B2 | 10/2012 | Ashfield et al. |
| 8,321,913 | B2 | 11/2012 | Turnbull et al. |
| 8,370,909 | B2 | 2/2013 | Heffez |
| 8,374,634 | B2 | 2/2013 | Dankar et al. |
| 8,572,391 | B2 | 10/2013 | Golan et al. |
| 8,606,299 | B2 | 12/2013 | Fok et al. |
| 8,611,919 | B2 | 12/2013 | Barnes, Jr. |
| 8,640,197 | B2 | 1/2014 | Heffez |
| 8,668,568 | B2 | 3/2014 | Denker et al. |
| 8,676,684 | B2 | 3/2014 | Newman et al. |
| 8,770,477 | B2 | 7/2014 | Hefetz |
| 8,793,776 | B1 | 7/2014 | Jackson |
| 8,904,496 | B1 | 12/2014 | Bailey et al. |
| 9,014,666 | B2 | 4/2015 | Bentley et al. |
| 9,033,225 | B2 | 5/2015 | Hefetz |
| 9,391,985 | B2 | 7/2016 | Hefetz |
| 9,473,511 | B1 | 10/2016 | Arunkumar et al. |
| 9,727,867 | B2 | 8/2017 | Heffez et al. |
| 10,289,833 | B2 | 5/2019 | Hefetz |
| 10,521,786 | B2 | 12/2019 | Hefetz |
| 10,552,583 | B2 | 2/2020 | Piccionelli et al. |
| 10,554,645 | B2 | 2/2020 | Hefetz |
| 10,645,072 | B2 | 5/2020 | Heffez et al. |
| 11,308,477 | B2* | 4/2022 | Hefetz ............... G06Q 20/4016 |
| 2001/0034718 | A1 | 10/2001 | Shaked et al. |
| 2002/0016831 | A1 | 2/2002 | Peled et al. |
| 2002/0019699 | A1 | 2/2002 | McCarty et al. |
| 2002/0035622 | A1 | 3/2002 | Barber |
| 2002/0053018 | A1 | 5/2002 | Ota et al. |
| 2002/0073044 | A1 | 6/2002 | Singhal |
| 2002/0089960 | A1 | 7/2002 | Shuster |
| 2002/0188712 | A1 | 12/2002 | Caslin et al. |
| 2003/0009594 | A1 | 1/2003 | McElligott |
| 2003/0056096 | A1 | 3/2003 | Albert et al. |
| 2003/0061163 | A1 | 3/2003 | Durfield |
| 2003/0101134 | A1 | 5/2003 | Liu et al. |
| 2003/0134648 | A1 | 7/2003 | Reed et al. |
| 2003/0135463 | A1 | 7/2003 | Brown et al. |
| 2003/0144952 | A1 | 7/2003 | Brown |
| 2003/0187800 | A1 | 10/2003 | Moore et al. |
| 2003/0190921 | A1 | 10/2003 | Stewart |
| 2003/0191568 | A1 | 10/2003 | Breed |
| 2004/0073519 | A1 | 4/2004 | Fast |
| 2004/0081109 | A1 | 4/2004 | Oishi |
| 2004/0088551 | A1 | 5/2004 | Dor et al. |
| 2004/0111640 | A1 | 6/2004 | Baum |
| 2004/0219904 | A1 | 11/2004 | De Petris |
| 2004/0230811 | A1 | 11/2004 | Siegel et al. |
| 2004/0234117 | A1 | 11/2004 | Tibor |
| 2004/0242201 | A1 | 12/2004 | Sasakura et al. |
| 2004/0254868 | A1 | 12/2004 | Kirkland et al. |
| 2004/0259572 | A1 | 12/2004 | Aoki et al. |
| 2005/0021738 | A1 | 1/2005 | Goeller et al. |
| 2005/0022119 | A1 | 1/2005 | Kraemer |
| 2005/0027543 | A1 | 2/2005 | Yannis |
| 2005/0027667 | A1 | 2/2005 | Kroll |
| 2005/0065875 | A1 | 3/2005 | Beard |
| 2005/0066179 | A1 | 3/2005 | Seidlein |
| 2005/0075985 | A1 | 4/2005 | Cartmell |
| 2005/0086164 | A1 | 4/2005 | Kim et al. |
| 2005/0143916 | A1 | 6/2005 | Kim et al. |
| 2005/0159173 | A1 | 7/2005 | Dowling |
| 2005/0160280 | A1 | 7/2005 | Caslin et al. |
| 2005/0180395 | A1 | 8/2005 | Moore et al. |
| 2005/0198218 | A1 | 9/2005 | Tasker et al. |
| 2006/0031830 | A1 | 2/2006 | Chu et al. |
| 2006/0064374 | A1 | 3/2006 | Helsper et al. |
| 2006/0085310 | A1 | 4/2006 | Mylet et al. |
| 2006/0085357 | A1 | 4/2006 | Pizarro |
| 2006/0107307 | A1 | 5/2006 | Knox et al. |
| 2006/0128397 | A1 | 6/2006 | Choti et al. |
| 2006/0194592 | A1 | 8/2006 | Clough |
| 2006/0217131 | A1 | 9/2006 | Farshid et al. |
| 2006/0277312 | A1 | 12/2006 | Hirsch |
| 2006/0282285 | A1 | 12/2006 | Helsper et al. |
| 2007/0053306 | A1 | 3/2007 | Stevens |
| 2007/0055672 | A1 | 3/2007 | Stevens |
| 2007/0055684 | A1 | 3/2007 | Stevens |
| 2007/0055732 | A1 | 3/2007 | Stevens |
| 2007/0055785 | A1 | 3/2007 | Stevens |
| 2007/0061301 | A1 | 3/2007 | Ramer et al. |
| 2007/0084913 | A1 | 4/2007 | Weston |
| 2007/0133487 | A1 | 6/2007 | Wang et al. |
| 2007/0136573 | A1 | 6/2007 | Steinberg |
| 2007/0174082 | A1 | 7/2007 | Singh |
| 2008/0046367 | A1 | 2/2008 | Billmaier |
| 2008/0046988 | A1 | 2/2008 | Baharis et al. |
| 2008/0146193 | A1 | 5/2008 | Bentley et al. |
| 2008/0132170 | A1 | 6/2008 | Farshid et al. |
| 2008/0189776 | A1 | 8/2008 | Constable |
| 2008/0222038 | A1 | 9/2008 | Eden et al. |
| 2008/0248892 | A1 | 10/2008 | Walworth |

(56) References Cited

U.S. PATENT DOCUMENTS

| | | |
|---|---|---|
| 2008/0249939 A1 | 10/2008 | Veenstra |
| 2009/0260075 A1 | 10/2009 | Gedge et al. |
| 2009/0276321 A1 | 11/2009 | Krikorian et al. |
| 2010/0051684 A1 | 3/2010 | Powers |
| 2013/0091544 A1 | 4/2013 | Oberheide et al. |
| 2013/0104198 A1 | 4/2013 | Grim |
| 2013/0197998 A1 | 8/2013 | Buhrmann et al. |
| 2013/0312078 A1 | 11/2013 | Oberheide et al. |
| 2014/0068723 A1 | 3/2014 | Grim et al. |
| 2014/0245379 A1 | 8/2014 | Oberheide et al. |
| 2014/0245389 A1 | 8/2014 | Oberheide et al. |
| 2014/0245450 A1 | 8/2014 | Oberheide et al. |
| 2015/0040190 A1 | 2/2015 | Oberheide et al. |
| 2015/0046989 A1 | 2/2015 | Oberheide et al. |
| 2015/0046990 A1 | 2/2015 | Oberheide et al. |
| 2015/0074408 A1 | 3/2015 | Oberheide et al. |
| 2015/0074644 A1 | 3/2015 | Oberheide et al. |
| 2015/0161378 A1 | 6/2015 | Oberheide et al. |

FOREIGN PATENT DOCUMENTS

| | | |
|---|---|---|
| EP | 1696626 A1 | 8/2006 |
| EP | 1708527 A1 | 10/2006 |
| EP | 1875653 A2 | 1/2008 |
| GB | 2383497 B1 | 6/2003 |
| GB | 2402792 A | 12/2004 |
| KR | 1020030043886 A | 6/2003 |
| WO | WO1996041488 A1 | 12/1996 |
| WO | WO2000075760 A1 | 12/2000 |
| WO | WO2001028272 A1 | 4/2001 |
| WO | WO2001054091 A2 | 7/2001 |
| WO | WO2002093502 A1 | 11/2002 |
| WO | WO2004/079499 A2 | 9/2004 |
| WO | WO04095857 A1 | 11/2004 |
| WO | 2005071988 A1 | 8/2005 |
| WO | WO2007004224 A1 | 1/2007 |

OTHER PUBLICATIONS

Maxmind LLC, "General Guidelines for Preventing Online Credit Card Fraud" May 12, 2005 http://web.archive.org/web/20050516073510/http://www.maxmind.com/app/prevent_credit_card_fraud (retrieved Sep. 28, 2022).

K. Charlton, N. Taylor, "Online Credit Card Fraud against Small Businesses", Australian Institute of Criminology, Research and Public Policy Series, No. 60; pp. 14-20. https://www.aic.gov.au/publications/rpp/rpp60.

Dorothy E.Denning, Peter F.MacDoran: "Location-based authentication: grounding cyberspace for better security", Computer Fraud and Security, Oxford, GB, (Feb. 1, 1996) XP-002117683 https://www.sciencedirect.com/science/article/abs/pii/S13613723978261397via%3Dihub.

Hideyuki Takamizawa and Noriko Tanaka: International Journal of Computer Theory and Engineering vol. 4, No. 2, Apr. 2012: "Authentication System Using Location Information on iPad or Smartphone." http://www.ijcte.org/papers/441-A075.pdf.

Terry Sweeney: "SIS Taps Mobiles to Reduce Credit Fraud"; Mar. 5, 2008 05:09 PM; paragraphs 1 2 and 3 https://www.informationweek.com/sis-taps-mobiles-to-reduce-credit-fraud/d/d-id/1065356?

Newbury Networks WiFi Workplace http://www.newburynetworks.com/downloads/WiFiWorkpl%D7ace.pdf via archive.com Jun. 19, 2004: Enterprise WLAN Management & Security 2004; pp. 3, 4.

Newbury Networks WiFi Workplace http://www.newburynetworks.com/downloads/WifiWatchDog_DataSh%D7eet.PDF via archive.com Jun. 18, 2004: "WiFiWatchdog TM": pp. 2, 3.

Thomas Mundt: "Two Methods of Authenticated Positioning." Oct. 2, 2006; University of Rostock Institute of Computer Science. pp. 1, 3, 4.

Bill N. Schilit, Anthony Lamarca, Gaetano Borriello, William G. Griswold, David McDonald, Edward Lazowska, Anand Balachandran, Jason Hong and Vaughn Iverson. "Ubiquitous Location-Aware Computing and the "Place Lab" Initiative." Sep. 19, 2003. p. 2.

Sybren A. Stuvel: "Sadako—Securing a building using IEEE 802.11" Jun. 16, 2006; Universiteit van Amsterdam; p. 7.

cyota.com via Archive.org: Cyota Esphinx 2006; http://www.cyota.com/product_7.asp; http://www.cyota.com/product_7_19.asp; http://www.cyota.com/product_11_26.asp; http://www.cyota.com/product_11_25.asp.

Debopam Acharya, Nitin Prabhu, and Vijay Kumar: "Discovering and Using Web Services in M-Commerce" 2005; SCE, Computer Networking, University of Missouri-Kansas City. Springer-Verlag Berlin Heidelberg 2005. pp. 13-14.

Jeyanthi Hall: "Detection of Rogue Devices in Wireless Networks." Aug. 2006; Ottawa-Carleton Institute for Computer Science, School of Computer Science, Carleton University Ottawa, Ontario; Abstract, pp. 10, 91, 92, 98-100, 143, 203, 205, 208.

Jakob E. Bardram, Rasmus E. Kjær, and Michael Ø. Pedersen: "Context-Aware User Authentication—Supporting Proximity-Based Login in Pervasive Computing" 2003; Springer-Verlag Berlin Heidelberg 2003; Department of Computer Science, University of Aarhus. pp. 111-113, 119.

Frank Adelstein, Prasanth Alla, Rob Joyce and Golden G. Richard III: "Physically Locating Wireless Intruders" 2005; Journal of Universal Computer Science, vol. 11, No. 1 (2005); pp. 3, 4, 5, 6, 14.

thecyberangel.com via Archive.org http://www.thecyberangel.com/pdrs/CyberAngelWhitePaper.pdf: CyberAngel Security Software White Paper. Feb. 17, 2006; pp. 5, 7, 17, 18, 31.

Kenya Nishiki and Erika Tanaka: "Authentication and Access Control Agent Framework for Context-Aware Services." 2005; Systems Development Laboratory, Hitachi, Ltd. Computer Society. pp. 1-4.

Business Wire: "Newbury Networks Introduces RF Firewall for Location-Based Access Control and Policy Enforcement": May 21, 2007; Las Vegas. pp. 1-2.

Wayne Jansen Serban Gavrila and Vlad Korolev: "Proximity Beacons and Mobile Device Authentication: An Overview and Implementation." Jun. 2005; National Institution of Standards and Technology. US Department of Commerce. Abstract, pp. 1-2, 7, 19.

PR Newswire: "Interlink Networks and Bluesoft Partner to Deliver Wi-Fi Location-Based Security Solutions" Apr. 24, 2003. PRNewswire Ann Arbor, Mich. and San Mateo, Calif. p. 1.

Paul C. Van Oorschot, S. Stubblebine: "Countering Identity Theft through Digital Uniqueness, Location Cross-Checking, and Funneling" Feb. 28-Mar. 3, 2005 Financial Cryptography and Data Security 9th International Conference, FC 2005 Roseau, The Commonwealth of Dominica. pp. 3, 6, 7, 11-13.

Shashwat V. Bhavsar: "Wireless Application Environments and Location-Aware Push Services" Dec. 2005; University of New Brunswick. pp. 119, 123, 138-142, 150, 152, 153.

Simon G. M. Koo, Catherine Rosenberg, Hoi-Ho Chan, and Yat Chung Lee: "Location-based E-campus Web Services: From Design to Deployment" 2003. School of Electrical and Computer Engineering and Center for Wireless Systems and Applications, Purdue University, West Lafayette, IN 47907-1285, pp. 4, 5, 7.

Maxmind.com via Archive.org http://www.maxmind.com/app/news_20060130 "Skyhook Wireless and MaxMind Announce Partnership" Boston, MA, Jan. 30, 2006. p. 1.

Maxmind.com via Archive.org https://www.maxmind.com/MaxMind_minFraud_Overview.pdf: Maxmind MiniFraud. Jan. 8, 2007. pp. 1-2.

thecyberangel.com via Archive.org http://www.thecyberangel.com/pr/TheCA_SkyhookPart.pdf. Jun. 20, 2005; Nashville, TN and Boston, MA. "CyberAngel Security Solutions and Skyhook Wireless Announce Groundbreaking New Laptop Recovery System" pp. 1, 2.

LRSA Security via Archive.org http://www.rsasecurity.com/solutions/consumer_authentication/ADAPT_SB_0106.pdf "RSA® Adaptive Authentication the Logical Consumer Solution" p. 2. Mar. 14, 2006. RSA Adaptive Authentication for web; https://web.archive.org/web/20061230232715/http://www.rsasecurity.com/node.asp?id=3018 (archived Dec. 30, 2006).

(56) References Cited

OTHER PUBLICATIONS

Cyota eSphinx—How does it work? https://web.archive.org/web/20060324224711/http://www.cyota.com//product_7_19.asp (Archived Mar. 24, 2006).

RSA eFraudNetwork; https://web.archive.org/web/20061210150954/http://www.rsasecurity.com/node.asp?id=3071 (archived Dec. 10, 2006).

Sharma, Seema, "Location based authentication" M.S. Thesis, University of New Orleans, May 20, 2005. https://scholarworks.uno.edu/td/141/.

Lenders, V. et al., "Location-Based Trust for Mobile User-granted Content: Applications, Challenges and Implementations", HotMobile '08:Proceedings of the 9th workshop on Mobile computing systems and applications, Napa Valley, CA Feb. 25-26, 2008, pp. 60-64.

"Security System Matches Card Purchase to Cellphone Location." ePaynews, the Payment News and Resource Center. May 13, 2008 https://www.atmmarketplace.com/news/security-system-matches-card-purchase-to-cell-phone-location/.

* cited by examiner

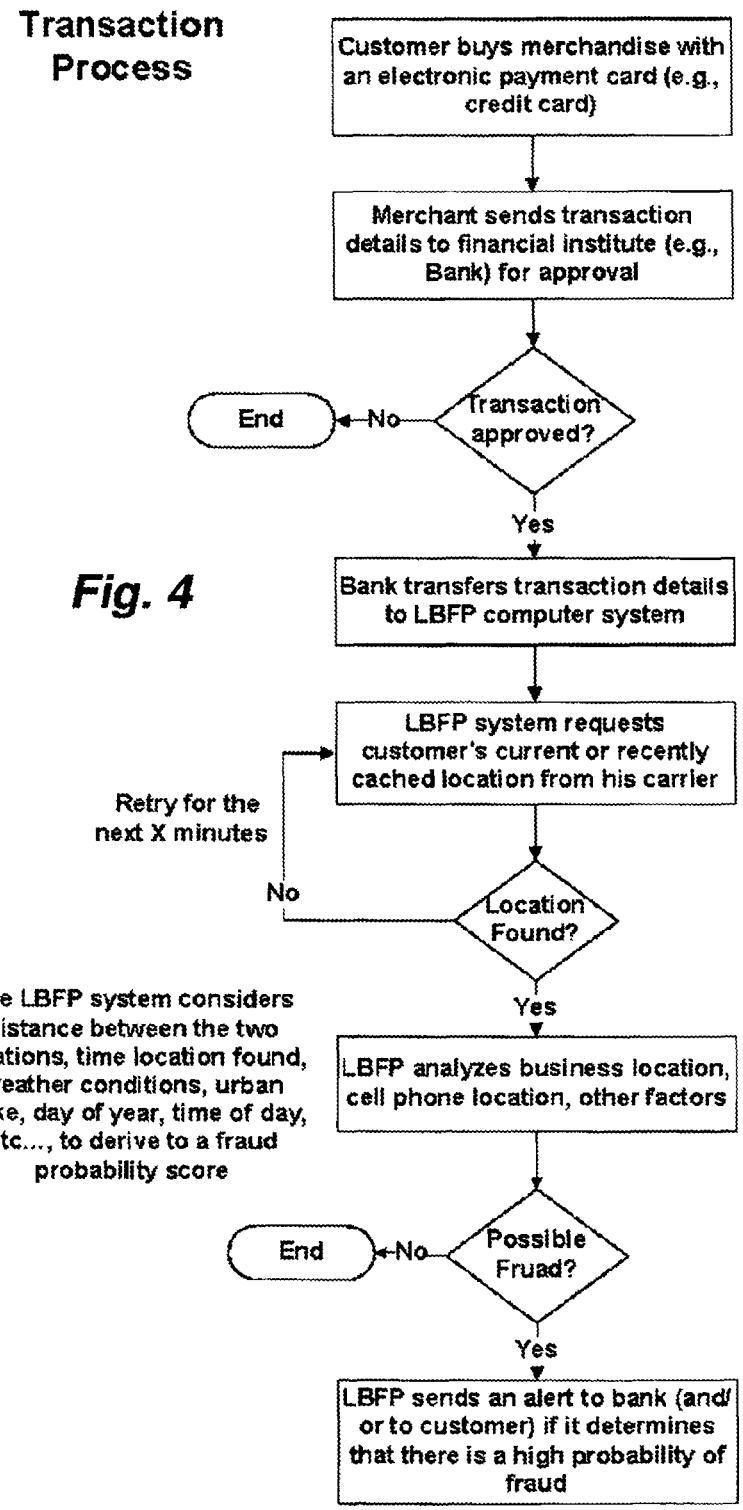

METHOD AND SYSTEM FOR MONITORING AND VALIDATING ELECTRONIC TRANSACTIONS

CROSS-REFERENCE TO RELATED APPLICATIONS

This application is a continuation-in-part of U.S. patent application Ser. No. 16/724,361, filed Dec. 22, 2019, now U.S. Pat. No. 11,308,477.

Application Ser. No. 16/724,361 is a continuation-in-part of U.S. patent application Ser. No. 15/787,805, filed Oct. 19, 2017, now U.S. Pat. No. 10,521,786, which is a continuation-in-part of U.S. patent application Ser. No. 15/606,270, filed May 26, 2017, now U.S. Pat. No. 10,289,833, which is a continuation-in-part of U.S. patent application Ser. No. 15/134,545, filed Apr. 21, 2016, now U.S. Pat. No. 9,727,867, which is a continuation-in-part of U.S. patent application Ser. No. 14/835,707, filed Aug. 25, 2015, now U.S. Pat. No. 9,391,985, which is a continuation-in-part of U.S. patent application Ser. No. 14/479,266, filed Sep. 5, 2014 and now abandoned, which is a continuation-in-part of U.S. patent application Ser. No. 14/145,862, filed Dec. 31, 2013, now U.S. Pat. No. 9,033,225, which is a continuation-in-part of U.S. patent application Ser. No. 13/479,235, filed May 23, 2012, now U.S. Pat. No. 8,770,477, which is a continuation-in-part of U.S. patent application Ser. No. 13/065,691 filed Mar. 28, 2011, now U.S. Pat. No. 8,640,197, which in turn claims priority of U.S. provisional application No. 61/445,860 filed on Feb. 23, 2011 and U.S. provisional application No. 61/318,329 filed on Mar. 28, 2010.

U.S. patent application Ser. No. 13/065,691 is also a continuation-in-part of U.S. patent application Ser. No. 12/260,065 filed on Oct. 28, 2008 and now abandoned, which is a continuation-in-part of U.S. patent application Ser. No. 11/346,240 filed on Feb. 3, 2006, now U.S. Pat. No. 7,503,489, which in turn claims priority from U.S. provisional application No. 60/674,709, filed Apr. 26, 2005.

U.S. patent application Ser. No. 13/065,691 is also a continuation-in-part of U.S. patent application Ser. No. 12/357,380, filed on Jan. 21, 2009, now U.S. Pat. No. 8,656,458, which is a continuation-in-part of U.S. Patent application Ser. No. 11/405,789 filed on Apr. 18, 2006, now U.S. Pat. No. 8,590,007, which in turn claims priority from U.S. provisional application No. 60/711,346 filed on Aug. 25, 2005.

U.S. application Ser. No. 13/065,691 is also a continuation-in-part of U.S. patent application Ser. No. 12/600,808, filed on May 29, 2007, now U.S. Pat. No. 8,370,909, which in turn is a 371 (National Stage in the US) of PCT/US07/012552 filed May 29, 2007.

U.S. application Ser. No. 13/479,235 is also a continuation-in-part of U.S. patent application Ser. No. 13/290,988, filed on Nov. 7, 2011, now U.S. Pat. No. 8,413,898, which in turn is a divisional of U.S. application Ser. No. 12/260,065, supra.

The contents of each one of the above prior applications is incorporated herein by reference in its entirety.

FIELD OF THE INVENTION

This invention relates to a method and system for monitoring commercial electronic transactions, and methods for estimating the probability that a pending electronic transaction is fraudulent.

BACKGROUND OF THE INVENTION

As credit card and debit card purchases have expanded both in number and in the methods by which they can be accomplished, particularly electronic purchases, the opportunity for fraudulent, invalid or unauthorized purchases has increased. The expansion of such purchase opportunities has resulted in an increase in monetary losses to sellers, merchants, financial institutions and authorized holders of the authorized credit card and debit cards. In response, methods and systems have been developed to reduce the number of fraudulent purchases through verification processes and systems.

Merchants, in concert with the providers of consumer payment systems, are currently migrating away from the use of magnetic stripes on debit and credit cards which require a swipe through a magnetic card reader. So-called "tap & pay" devices contain an embedded chip and radio frequency antenna which, in the presence of an appropriate radio frequency query, transmit the user's account information to a merchant's receiver device. The use of such radio frequency identification ("RFID") devices adds convenience and speed to payment transactions. Such devices are also used to unlock security doors and gates, admitting to secure areas only those individuals who are in possession of the appropriate RFID device. A variation that is growing in popularity eliminates the credit card entirely by placing such RFID devices within consumers' mobile phones or other personal wireless devices. As used herein, "credit card tap" and "tap & pay" will refer to both card-based and mobile phone- and wireless device-based embodiments of the technology.

In theory, because an RFID device does not need to leave the user's hand, and typically has a broadcast range measured in inches, security is improved relative to magnetic stripe devices which are susceptible to surreptitious swiping by dishonest employees. However, an RFID device can be induced to broadcast the owner's account and identity information to a receiver operated by a fraudster or data thief. An illicit receiver placed close to the point of sale can capture the broadcast information at the time the tap & pay transaction is being made. A data thief can also carry on his person a transmitter and receiver that induce nearby RFID devices to transmit their owners' financial and personal information. With such a device, it is possible to "harvest" personal data from a large number of RFID devices merely by getting physically close to victims' wallets or purses, an easy task in a crowded store or elevator. In a process known as "cloning", the harvested information is later used by the thief, or by persons who have paid the thief for the data, to program counterfeit RFID devices that can be used to impersonate the rightful owner in fraudulent "tap & pay" transactions, or to access locations that are secured by RFID identification tags. An Internet-based underground market already exists for supplying criminals with the necessary equipment and software, and for the distribution and sale of the harvested data.

Traditional credit card transactions can be completed in about a minute, whereas RFID-mediated transactions require only a few seconds. For this reason, there is a need for accelerated means of verifying identity and authenticating "tap & pay" transactions in less than a second.

An example of a method of increasing the security of payments made by credit and cash cards is set forth in U.S. Patent Publication No. 20040073519.

Another example of a method of increasing the security of payments made by credit and cash cards is set forth in U.S. Patent Publication No. 20040254868.

US Patent Publication No. 20040219904 sets forth methods of improving the security of transactions using geographic locations.

International Patent Application No. WO 2004/079499 of Eden et al. describes a method of verifying user identity in which the geographic location of a mobile network device, which is known to be carried by a user, is compared with the geographic location from which a transaction request is initiated. A substantially similar system is disclosed in US Patent Publication No. 20030169881 (U.S. Pat. No. 7,376, 431), which describes a fraud prevention system employing geographic comparison of a position sensor on a person and a separate position sensor at the point of sale.

A cellular telephone location system for automatically recording the location of one or more mobile cellular telephones, known as Time Difference on Arrival (TDOA), is described, for example, in U.S. Pat. No. 5,327,144. The system comprises a central site system operatively coupled to at least three cell sites. Each of the cell sites receives cellular telephone signals and integrates a timing signal common to all the cell sites. The central site calculates differences in times of arrival of the cellular telephone signals arriving among the cell sites and thereby calculates the position of the cellular telephone producing the cellular telephone signals. Additional examples of known methods for locating phones are cell sector and cell site. The full disclosure of U.S. Pat. No. 5,327,144 is hereby incorporated by reference in its entirety.

The need for rapid and accurate geolocation of mobile voice devices is not limited to the authentication of commercial transactions. Federal Communications Commission (FCC) has mandated wireless Enhanced 911 (E911) rules to improve the effectiveness and reliability of wireless 911 service. One requirement is that 95% of a network operator's in-service phones must be E911 compliant, i.e., location capable, whether via GPS circuitry in the handset or via radiolocation through the network. At present, carriers must provide 911 dispatchers at a Public Safety Answering Point (PSAP) with the telephone number of a wireless 911 caller, and the location of the antenna that received the call, but the rules call for the provision of more accurate geolocation data in the future. There is, accordingly, a need in the field of public safety for the rapid and automatic acquisition of cell phone location information.

Prior art transaction authentication methods based on geolocation of a mobile voice device are, in general, not capable of authenticating transactions in a matter of a few seconds, or in less than a second. In particular, they do not suggest capturing automatically the user's mobile voice device broadcast information while the user is at the point of sale, and using such broadcast information to request the mobile voice device location information from the carrier, before the credit card transaction takes place or before the user provides the credit card information to the merchant. Prior art methods request the mobile phone location after the initiation of a transaction and the provision of the credit card information, therefore the time required for authentication is extended by the time needed to locate the mobile phone.

SUMMARY OF THE INVENTION

The present invention provides methods for facilitating the detection of misuse of an identity during an electronic transaction. The present invention comprises several embodiments. In a first embodiment, the method comprises the steps of: receiving a notification to authenticate the use of an identity at a first location, wherein the identity is associated with a first wireless terminal; determining an approximate location of the first wireless terminal based on cached position information, the approximate location of the first wireless terminal being a second location; determining whether the first and second locations match in geographical proximity; and generating an alert if the first and second locations do not match in geographical proximity. In a second embodiment, an approximate location of the first wireless terminal is determined based on cached position information stored on a GPS position database. For some embodiments, an approximate geographical location of the Internet user is determined using wireless technology.

Mobile carriers' location infrastructure allows accurate geographic location of a mobile phone within about 30 seconds. In order to minimize inconvenience to consumers and merchants anti-fraud assessments should be done within a few seconds or in less than a second. The methods of the present invention reduce the time involved in identifying and comparing the locations of a mobile voice device and a transaction request. The ability to establish a mobile phone location before the user is making the credit card transaction, and use such mobile phone location to authenticate such POS transaction in a few seconds or less, will improve the use of mobile phone location in anti-fraud assessment. Some companies will not use mobile phone location information in antifraud assessment if getting such information takes more than a few seconds, because such additional time affects the time the customer has to wait for authorization.

BRIEF DESCRIPTION OF THE DRAWINGS

FIG. 4 shows a non-limiting flow chart of one embodiment of the invention.

Figure 1:
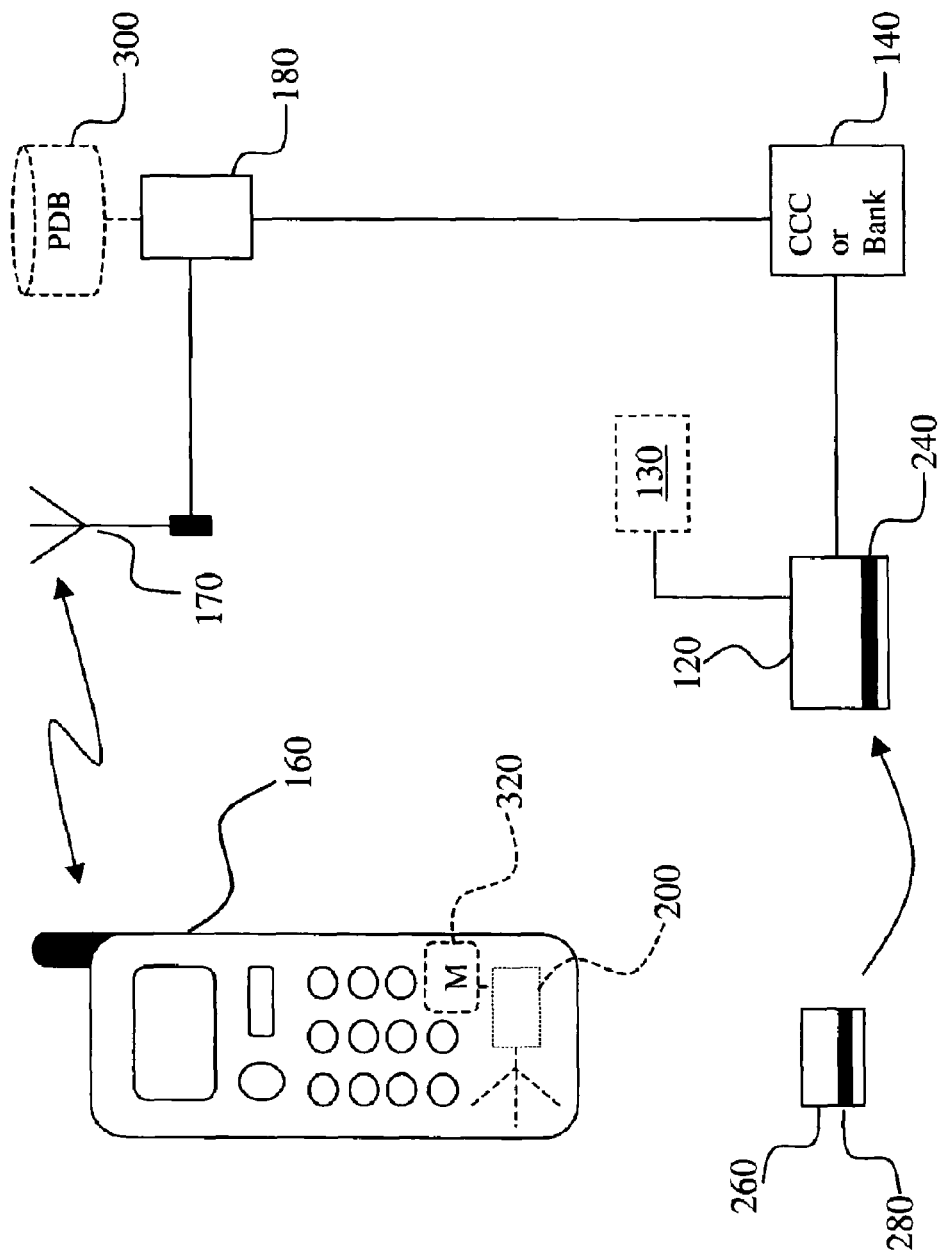
FIG. 1 is a schematic block diagram showing exemplary hardware elements that can enable the practice of the various embodiments of the present invention.

It should be understood that the attached figures are illustrative, and are not intended to limit the scope of the present invention in any way.

DETAILED DESCRIPTION OF THE INVENTION

This invention relates to a method and system for monitoring electronic transactions. In general terms, in one aspect of the invention a user identity (such as the user's credit card, cash card, etc.) is associated with a first wireless terminal, e.g., the user's cell phone. The position of the user's cell phone is determined at intervals and cached (i.e., archived) to provide a stream of regularly updated pre-transaction positions. Each cached pre-transaction position can be stored on a remote position database (PDB) or on the user's cell phone. If the user's identity such as the user's credit or cash card is later used, for example, at a point of sale (POS) electronic terminal having a known location (being a first location), the invention detects the use of the user's credit card (i.e., identity) at the first location and compares the first location with the most recent cached position of the user's cell phone (now treated as a pre-transaction position to provide a second location for comparison). Specifically, a determination is made as to whether the first and second locations match in geographical proximity. If the first and second locations do not match in geographical proximity, the invention generates an alert or advisory message that is communicated to a predetermined notification device, such as the user's email account, a POS electronic terminal, a financial institution's computers or offices (such as the user's credit card company's computers, etc.). The alert can also be a reply message for blocking an associated electronic transaction at the first location.

The invention can be adjusted such that as each new pre-transaction position corresponding to the user's cell phone becomes available, the new pre-transaction position can be used to overwrite the currently archived pre-transaction position to prevent illicit or unauthorized tracking of the user's movements.

In another aspect of the invention, if the latest archived pre-transaction location (i.e., second location) and known POS location (i.e., first location) don't match, a post-transaction position (being a third location) of the user's cell phone is obtained and compared to the known first location and an alert generated if the post-transaction location (third location) and known POS location (first location) do not match in geographical proximity. Such matching can be based on a predetermined distance. For example, if the post-transaction location of the user's cell phone is determined to be more than 5 miles from the known POS location, an alert is generated and communicated to a predetermined device such as the user's cell phone and/or email address, and/or to an appropriate financial institution such as the user's bank or a credit card company's computers, the user's wireless personal digital assistant or a user's wireless enabled laptop, etc. Thus, if the actual position of the user's cell phone is not available at about the time of the transaction, the pre or post-transaction position of the user's cell phone can be used to determine if an alert is warranted.

For example, the user's cell phone may include a GPS receiver capable of determining the position of the user's cell phone, but only if the user's GPS capable cell phone is able to receive GPS signals necessary to calculate the location of the user's cell phone. GPS signals are transmitted by dedicated satellites and are often not strong enough to be received inside buildings where many ATM and POS terminals are located. The invention provides a non-obvious way of monitoring the use of one or more identities (such as a credit card or cash card number) associated with a user regardless of the ability of a user's cell phone to pick up GPS signals at the time of transaction (i.e., when the user's identity is used to authorize a transaction).

Specifically, through such monitoring, the invention facilitates the detection of a possible fraudulent or an invalid electronic purchase involving the use of a user's identity, for example, a credit card, debit card or any other kind of electronic payment or purchase system including biometric based purchases. Upon detection of suspect purchase or transaction (such as a cash withdrawal at an ATM), an advisory message is communicated to a predetermined notification device. The intent of this invention is to provide an alert upon detection of an inappropriate purchase or transaction.

The invention is now described in more detail. A computer signature (unique ID) is created by identifying certain characteristics of the computer. These characteristics act as identifiers of the computer or mobile wireless terminal such as PDA, Mobile Phone, Smart Phone, Mobile computer, Laptop, Mini Laptop or any such device with computing and communicating via wireless capabilities. Every device that is connected to the Internet has a few unique identifiers such as, but not limited to: Computer Network MAC address, CPU serial number, Operating System S/N, Cookie, and more. In addition to the above, the computer uses other network resources that have unique identifiers such as, but not limited to, a Gateway or Router MAC address. In addition to the above, every computer has common identifiers such as, but not limited to: Operating system version, Disk Size, Internet browser version, hardware installed on the computer, network card speed, Operating system patches installed on the computer, CPU speed, memory size, cookie, secret cookie, virtual memory size, unique software installed by vendor which can uniquely identify the user or other installed software on the computer, and more. Using one or more common identifiers together, it is possible to create one unique computer signature for any given computer.

Online vendors request from the Internet user a contact number for a wireless communications device, which is accessible to the Internet user at the Internet user's current location or, alternatively, use the Internet user's wireless communication device to locate the user's geographical location. "Wireless communication device", as used in the context of the present invention, applies to any communication device capable of communicating with another communication device via wireless technology or determining the Internet user's location using wireless technology. Non-limiting examples include Wi-Fi™, WiMAX, antenna triangulation, Cell ID, GPS, Galileo, radio or any other such wireless networks known now or in the future.

When the Internet user provides a contact number for his wireless communication device, or similarly effective contact information, the vendor may use the contact information to access the Internet user's wireless device, or to request the geographical location of such wireless communication device from the carrier or aggregator. The carrier or aggregator will reply with the geographical location information and may also provide additional parameters such as 'phone accuracy' or 'location error'. Other possible methods include geo-locating the Internet user's wireless device using wireless information provided from such wireless communication device. The geo-location of the Internet user's wireless device is then associated with the Internet user. Another method of obtaining wireless communication device geographical location is by getting the geographical information directly from the wireless communication device by using HTML5. In a separate step, the location of the Internet user may be compared with the location of the computer which the Internet user was using to reach the vendor (in some cases, the same as the wireless device) for authentication purposes.

By identifying the Internet user's unique ID (or computer signature) a web site can get the geographical location associated with that user. Determining the Internet user's geographical location using wireless technology will allow improved services to the Internet user. For example: if Google™ knows exactly where the Internet user is geographically located then Google™ can provide search results that are relevant to that Internet user's geographical location. If an Internet user is searching for "pizza" then Google™ can provide the closest pizza shop to the Internet user's location.

It should be understood that the terms "wireless terminal", "wireless communication device" and "mobile voice device", as used in the context of the present invention, apply to any device capable of communicating with a wireless network or cellular system. A non-limiting example of a first wireless terminal includes a cellular telephone. Other non-limiting examples include devices that have been modified or designed to communicate with a wireless network, such as a Personal Digital Assistant ("PDA"), such as a Wi-Fi™ capable PDA, or a Blackberry™ (such as the Blackberry™ 7520 model).

The predetermined notification device can be any suitable device capable of receiving communications directly or indirectly from a wireless network, such as, but not limited to: a first mobile terminal, a second mobile terminal, a Personal Digital Assistant (PDA) capable of communicating with a wireless network, a laptop computer capable of communicating with a wireless network, a message server, and an email server, an electronic terminal 120, alone or in combination. An alert may be sent to an electronic terminal 120 at the first location, wherein the alert prevents a transaction associated with the identity.

The position of a mobile terminal can be determined by, for example, an internal positioning apparatus and an external position apparatus, alone or in combination. Examples of internal positioning apparatus include a GPS receiver built into the mobile terminal that receives Global Positioning System ("GPS") radio signals transmitted from GPS satellites. The GPS system can be supplemented with an INS (inertial navigation system) also built into the mobile terminal (see FIG. 2).

The external positioning apparatus can be a cellular positioning system that computes the position of the mobile terminal by observing time differences among the arrivals of a radio signal transmitted by the mobile terminal at a plurality of observation points, i.e., base stations, which typically form part of the wireless network. Alternatively, the external positioning apparatus could be a single base station that the mobile terminal is in contact with. Each base station has a particular base station ID and a location associated with the base station ID. Thus, the location of a mobile terminal can be approximated to the actual location of a base station, although, given that the typical area covered by a base station may be about one kilometer, the position of the mobile terminal will not be known with accuracy.

The role of base stations in wireless networks is described, for example, in "Cellular Radio Systems", published by Artech House, Boston (editors: D. M. Balston and R. C. V. Macario; ISBN: 0-89006-646-9); "Digital Cellular Radio" written by G. Calhoun and published by Artech House, Boston (ISBN: 0-89006-266-8). "Cellular Radio Systems" and "Digital Cellular Radio" are hereby incorporated by reference in their entirety.

The position of a mobile terminal can also be tracked using external RFID tags (Radio Frequency Identification tags) in combination with an RFID reader built into the mobile terminal. How RFID tags and readers work is described in U.S. Patent Publication No. 20050143916 published Jun. 30, 2005 to Kim, In-Jun, et al. U.S. Patent Publication No. 20050143916 is incorporated by reference herein in its entirety.

In a first embodiment of the present invention, a method is provided for facilitating the detection of misuse of an identity during an electronic transaction. The first embodiment comprises the steps of: receiving a notification to authenticate the use of an identity at a first location, wherein the identity is associated with a first wireless terminal; determining an approximate location of the first wireless terminal based on cached position information, the approximate location of the first wireless terminal being a second location; determining whether the first and second locations match in geographical proximity; and generating an alert if the first and second locations do not match in geographical proximity.

The cached position information can be cached GPS position information stored on the first wireless terminal. The step of determining the second location can further comprise the step of updating the cached position information with an inertial navigation system correction performed by the first wireless terminal to provide an updated location of the first wireless terminal, the updated location being the second location.

In one aspect of the first embodiment, the step of determining the second location further comprises the step of detecting whether GPS signals are being received by the first wireless terminal to determine a post-transaction location of the first wireless terminal, the post-transaction location being the second location. The step of detecting whether sufficient GPS signals are being received by the first wireless terminal for the first terminal to determine a post-transaction is only performed if cached position information is not stored on the first wireless terminal or if the cached position information is stale. The cached position information is regarded as stale if the information has not been updated for a predetermined time period, e.g., has not been updated within the last 30 minutes, 15 minutes or even 5 minutes. The predetermined time period defining when the cached position information is updated can vary and may be factory set or optionally set by the owner or user of the identity.

The first wireless terminal can be any device that can wirelessly communicate with a network, such as a cell phone, which can communicate wirelessly with a wireless network. The terms "cell" and "cellular" are regarded as equivalent terms, as are "cell phone" and "smart phone".

The identity can be a credit card number, an account number, a debit card identification number, a driver's license number, a name and address, a social security number, a telephone number, a finger print, an iris scan identity, a retina scan identity, and a membership identity (such as a membership password), alone or in combination. The identity can also be any suitable biometric identity, such as a fingerprint, an iris scan identity and a retina scan identity, alone or in combination.

With respect to the notification associated with the use of the identity at the first location, the notification can be generated, for example, by an electronic transaction device (such as a credit card reader at a restaurant, an ATM machine such as a cash-withdrawal terminal that incorporates a card reader) at the first location or by, for example, a credit card company in communication with the electronic device at the first location.

It should be understood that the electronic transaction device could be any suitable device where the identity can be entered for the purpose of performing an electronic transaction. For example, a credit card with a credit card number can be read by the electronic device, and the credit card number communicated to the credit card company associated with the credit card, and in response the credit card company generates a notification, which is routed to the first wireless terminal. In response to receiving the notification, the first wireless terminal determines its location based on cached position information stored on the first wireless terminal or if the cached location information is stale requesting the first wireless terminal to provide a fresh location.

Referring to the invention in general, the generated alert can take any suitable form. For example, the alert can be an advisory message, which is communicated to at least one predetermined device. The at least one predetermined device could be the first wireless terminal and/or a second wireless terminal, wherein the first wireless terminal also acting as the predetermined device could be a cell phone. The predetermined device can be any suitable device, such as a Personal Digital Assistant (PDA) and/or a laptop capable of communicating with a wireless network and/or receiving emails, and a message server. An example of a message server is a server accessible via the world-wide-web and which stores messages for downloading by, for example, a wireless capable laptop with authorization to access the message server. The message server could be an email server programmed to store and/or forward emails to subscribers. Other examples of message servers include the Hotmail™ email system and the webmail service provided by Google called Gmail™.

Alternatively, the generated alert can be routed to the user's email address recorded during a previous registration of the identity. Alternatively, the alert is a reply message, such as a non-authorization message, for blocking an associated electronic transaction at the first location, and more particularly for blocking a transaction at the first location associated with the identity. It should be understood that the identity may not be limited to one identity, but could encompass one or more identities such as a user's credit card number together with the user's email address, social security number, phone number, residential address or phone number. Thus, a card reader may read a user's credit card and the user asked to enter or otherwise provide their email address or phone number. Some retail outlets routinely ask customers for their home phone number and/or address.

In one aspect of the invention, the use of an identity is associated with a first time stamp. The first time stamp corresponds to the time of the associated electronic transaction (or attempted electronic transaction) performed at a first location, and wherein the step of reading a cached location is associated with a second time stamp. The speed can be calculated based on the distance between the first and second locations and the time difference between the first and second time stamps such that the first and second locations are judged not to match in geographical proximity if the speed is above a predetermined value. Thus, if the speed to travel between the first and second locations is calculated to be about 1000 mph, and the predetermined value is set at 40 mph, an alert would be generated.

In another aspect of the first embodiment, if the first and second locations do not match in geographical proximity, then a confidence score is calculated to determine if the position mismatch with respect to the first and second locations is acceptable or unacceptable, and the alert is only generated if the confidence score is below a predetermined threshold. In addition to the time and distance difference, the system can also use additional factors to derive the confidence score. These factors can be weather conditions, time of day, day of year, urban makeup (e.g. a suburb area versus a downtown area), etc.

In still another aspect of the first embodiment, the step of determining the second location further comprises the step of detecting a Wi-Fi™ Unique ID associated with the position of the first wireless terminal, and converting the Wi-Fi™ unique ID into a post-transaction location for the first wireless terminal, the post-transaction location being the second location, wherein the step of detecting a Wi-Fi™ Unique ID is only performed if cached position information is not stored on the first wireless terminal. For example, if the wireless terminal lacks cached position information and the first wireless terminal is able to detect a Wi-Fi™ unique ID, then the Wi-Fi™ unique ID is used to determine the position of the first wireless terminal. This might entail accessing a database that matches a Wi-Fi™'s unique ID (i.e., identity such as, but not limited to, an Internet media-access-control (MAC) address) with known positions corresponding to each Wi-Fi™ unique ID. This database might be stored, for example, on a hard drive or memory chip fitted to the first wireless terminal 160.

In still another aspect of the first embodiment, the step of determining the second location further comprises the step of detecting a WiMAX Unique ID associated with the position of the first terminal, and converting the WiMAX Unique ID into a post-transaction location for the first wireless terminal, the post-transaction location being the second location, wherein the step of detecting a WiMAX Unique ID is only performed if cached position information is not stored on the first wireless terminal. Alternatively, the step of detecting a WiMAX Unique ID is only performed if the cached position information is stale, wherein the cached position information is regarded as stale if the information has not been updated for a predetermined time period. Those of skill in the art, enlightened by this disclosure, will recognize that various unique IDs may be associated with the position of the first terminal, including, in addition to GPS, Wi-Fi™, and WiMAX, IDs derived from cell phone signal triangulation or from obtaining a cell tower ID (or the equivalent) from the wireless system. Those of skill in the art, enlightened by this disclosure, will also appreciate that the present technique of geo-location using unique IDs may be used in a variety of related applications, such as providing geographically oriented search results from a search engine. For example, a user searching for a pizza store may be directed to one nearest him, rather than being left on his own to determine his location and pick the store off a map.

In still another aspect of the first embodiment, the step of determining the second location further comprises the step of obtaining a post-transaction position for the first wireless terminal as soon as the first wireless terminal is able to receive GPS signals to calculate its post-transaction position, the post-transaction position being the second location, wherein the step of obtaining a post-transaction position is only performed if cached position information is not stored on the first wireless terminal.

In still another aspect of the first embodiment, the step of determining the second location further comprises the step of obtaining a post-transaction position for the first wireless terminal as soon as the first wireless terminal is able to receive GPS signals to calculate its post-transaction position, the post-transaction position being the second location, wherein the step of obtaining a post-transaction position is only performed if the cached position information is stale, wherein the cached position information is regarded as stale if the information has not been updated for a predetermined time period.

In a second embodiment of the present invention, a method is provided for facilitating the detection of misuse of an identity during an electronic transaction. The second embodiment comprises the steps of: receiving a notification to authenticate the use of an identity at a first location, wherein the identity is associated with a first wireless terminal; determining an approximate location of the first wireless terminal based on cached position information stored on a GPS position database, wherein the GPS position database is operatively connected to a wireless provider 180 and/or a financial institution's computers 140, the approximate location of the first wireless terminal being a second location; determining whether the first and second locations match in geographical proximity; and generating an alert if the first and second locations do not match in geographical proximity.

In a third embodiment of the present invention, a method is provided for facilitating the detection of misuse of an identity during an electronic transaction, comprising the steps of: receiving a notification to authenticate the use of an identity at a first location, wherein the identity is associated with a first wireless terminal; reading a cached location of the first wireless terminal based on cached position information stored on the first wireless terminal, the location of the first wireless terminal being a second location; determining whether the first and second locations match in geographical proximity; determining a post-transaction location of the first wireless terminal if the first and second locations do not match in geographical proximity, the post-transaction location of the first wireless terminal being a third location; and generating an alert if: (1) the first and second locations do not match in geographical proximity and (2) the first and third locations do not match in geographical proximity.

Referring to the invention in general and with reference to the third embodiment, the post-transaction location can be obtained, for example, by processing GPS signals received by the first wireless terminal 160 within a reasonable time after the transaction (referred to hereinafter as "post-transaction GPS signals"). Post-transaction location can also be obtained, for example, using Wi-Fi™ unique ID (if available) or WiMAX unique ID. Alternatively, the post-transaction location can be obtained by using an inertial navigation module (INM) 400 (discussed infra) to convert the most recent cached location into a post-transaction location for the first wireless terminal, wherein updating the most recent cached position of the INM module is integrated into the design of the first wireless terminal (see, e.g., FIG. 3). Thus, the post-transaction location can be determined based on a method selected from the group consisting of: processing post-transaction GPS signals, Wi-Fi™ unique ID, and WiMAX unique ID, and any combination thereof.

In a fourth embodiment of the present invention, a method is provided for facilitating the detection of misuse of an identity during an electronic transaction, comprising the steps of: receiving a notification to authenticate the use of an identity at a first location, wherein the identity is associated with a first wireless terminal; reading a cached location of the first wireless terminal based on cached position information stored on the first wireless terminal, the location of the first wireless location being a second location; determining whether the first and second locations match in geographical proximity; determining the post-transaction location of the first wireless terminal if the first and second locations do not match in geographical proximity, the post-transaction location of the first wireless terminal being a third location; determining a post-transaction position of the first wireless terminal if (1) the first and second positions do not match in geographical proximity and (2) it is not possible to determine the post-transaction location, wherein the post-transaction position is treated as the third location; and generating an alert if: (1) the first and second locations do not match in geographical proximity and (2) the first and third locations do not match in geographical proximity.

FIG. 1 is a schematic block diagram showing exemplary hardware elements that can enable the practice of the various embodiments of the present invention. An electronic transaction terminal is shown at 120. The electronic transaction terminal 120 can be, for example, a credit and/or debit card terminal located at a first location such as a point of sale location inside a retail store, i.e., at a known first location. Alternatively, the terminal 120 could be a credit/debit card terminal linked to a cash register (not shown) or the terminal 120 could be a regular ATM (automatic teller machine) for dispensing cash to registered holders of cash cards. In other words, the terminal 120 can take various forms without detracting from the spirit of the present invention. If the first and second locations do not match in geographical proximity, the alert can be a reply message for blocking an associated electronic transaction at the first location.

The terminal 120 is operatively coupled to a financial institution's computers 140 such as a credit card company's computers or a bank's computers if, for example, terminal 120 is an ATM and used for cash withdrawals). The financial institution's computers 140 are those computers authorized to process the user's financial transactions. The financial institution's computers 140 are in turn able to communicate with a first wireless terminal 160 via a wireless provider 180 and, based on signal strength, the nearest base station 170 to the first wireless terminal 160. Examples of credit card companies include Visa™, Discover™, American Express™, MasterCard™, and Eurocard™. Examples of wireless providers include Sprint™ Verizon™ and T-Mobile™.

An optional position database (PDB) 300 can be operatively coupled to the wireless provider 180. Alternatively, PDB 300 can be operatively coupled to the financial institution's computer 140. The PDB 300 can be operatively coupled to more than one element such as wireless provider 180 and financial institution's computers 140. The PDB 300 can be directly or indirectly linked to wireless provider 180 and/or financial institution's computers 140. The terms "coupled" or "operatively coupled" are intended to cover both direct and indirect links. Pre-transaction and/or post-transaction positions with respect to the first wireless terminal 160 can be stored on the PDB 300. The PDB 300 can store positions derived from any known position determination technique such as, but not limited to, GPS position data derived from a GPS receiver 200 located on the first wireless terminal 160 (see, e.g., FIG. 2).

The optional PDB 300 can, for example, archive or cache a position history of the first wireless terminal 160. Thus, if the first wireless terminal 160 is unable to receive GPS signals or is switched off, the optional position database 300 can be accessed to provide the latest available position of the first wireless terminal 160, i.e., in this scenario, the first wireless terminal 160 uploads its position at predetermined intervals to the wireless vendor 180 and thence to the position database 300.

Alternatively, positions based on previously received GPS signals can be stored in a memory 320 integrated with the first wireless terminal 180. The memory 320 can be any suitable memory such as, but not limited to: a RAM chip, a floppy disk, a hard disk drive, a CD or DVD disc and reader, or any known memory or anticipated memory option, alone or in combination.

In FIG. 1, the wireless terminal 160 is a cell phone fitted with a GPS receiver 200. The first wireless terminal can also include memory for storing cached positions, i.e., a history of the positions of the first wireless terminal, so that if the wireless terminal is required to supply its post-transaction position but is unable to do so, perhaps because the first wireless terminal is unable to receive GPS signals, then the most recent cached position can be used. The first wireless terminal 160 can be a GPS enabled cell phone as shown, or any wireless terminal capable of communication with a wireless provider such as a Blackberry™ in combination with a GPS receiver.

Still referring to FIG. 1, terminal 120 includes a card reader 240 for reading a credit card 260. An identity in the form of a credit card number and details are stored on a magnetic strip 280 and are read by the card reader 240. It should be understood that the magnetic strip 280 could be replaced with any known or future technology, e.g., a smart chip embedded in a credit or debit card, which can be read by, for example, waving the card near a card reader enabled to so read credit and/or debit cards fitted with smart chips, or identity information displayed on the screen of a smart phone that may be read by a suitable optical scanner.

At any point after the identity has been read by terminal 120, a notification can be generated by the electronic terminal 120 or other device operatively coupled to the terminal 120, and/or the credit card company's or bank's computers 140. One or more notifications can be generated by, for example, the electronic transaction terminal 120 and the credit card company's or bank's computers 140, alone or in combination. The notification acts as a trigger wherein the post-transaction or cached position of the first wireless terminal 160 (treated as the second position) is determined and compared to the position of the electronic transaction terminal 120 (regarded as the first position). More specifically, a check is made to determine if the first and second positions match in geographical proximity. The task of determining if the first and second positions match in geographical proximity can be done by one or more elements such as, but not limited to, the first wireless terminal 160, the wireless provider 180 and the computers 140, the electronic transaction terminal 120 (or an optional processor 130 operatively coupled to the terminal 120), alone or in combination. If the computers 140, first wireless terminal 160, wireless provider 180, alone or in combination, is/are tasked to determine if the first and second positions match in geographical proximity, then the notification should include data representative of the first position of the electronic transaction terminal 120.

While wireless terminals (e.g., wireless mobile terminals such as cell phones) having a GPS receiver combined with a communication system capable of communicating with a base station are known (e.g., U.S. Pat. No. 5,945,944, which is incorporated by reference in its entirety, describes such a device), the prior art does not teach a method and system for monitoring electronic purchases and cash-withdrawals of the present invention.

Figure 2:
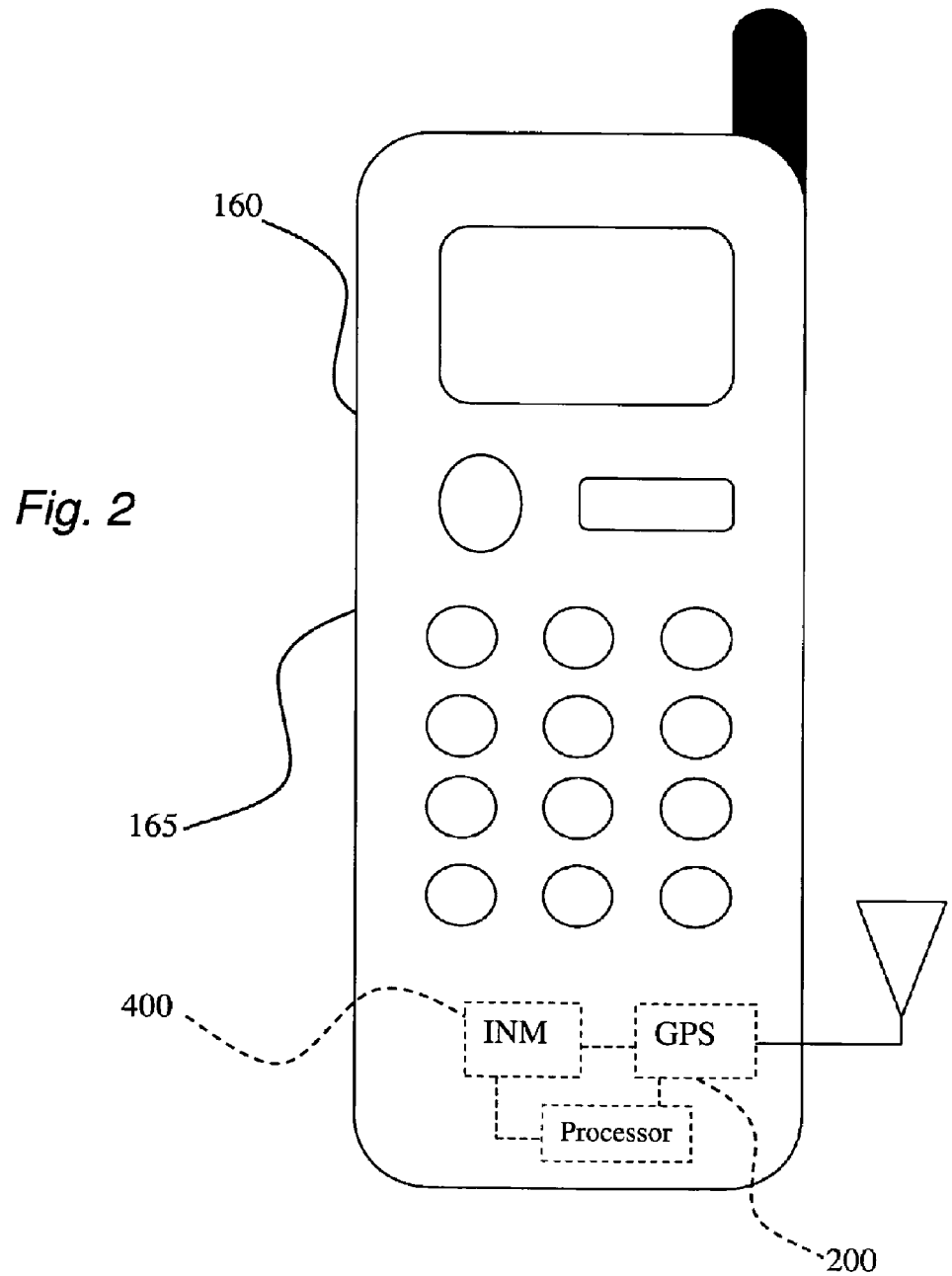
FIG. 2 shows a schematic block diagram of an exemplary first wireless terminal fitted with a GPS receiver operatively coupled to an inertial navigation system according to one aspect of the present invention.

In another embodiment, a GPS receiver 200 operatively coupled to a miniature inertial navigation module (INM) 400. FIG. 2 shows a schematic block diagram of an exemplary first wireless terminal 160 fitted with a GPS receiver 200 operatively coupled to an INM 400. The GPS receiver and INM combination can be housed inside the housing 165 of the first wireless terminal. Suppliers of miniature inertial navigation hardware include Analog Devices Inc. and Comarco, Inc. (and more particularly its subsidiary Comarco Wireless Technologies (CWT) of Irvine, Calif. 92618, USA). CWT miniature inertial modules are capable of precision position measurements in buildings and urban canyons and, when combined with a GPS receiver 200, can determine the position of a first wireless terminal 160 with a high degree of accuracy and reliability.

INM technology in the form of silicon is available, for example, from Analog Devices Inc. (ADI). The ADI ADXL103 (a 5 mm×5 mm×2 mm LCC package), which is a high accuracy, high stability, low cost, low power, complete single axis accelerometer with a signal conditioned voltage output, all on a single monolithic IC. The ADXL213 supplied by ADI is a precision, low power, complete dual axis accelerometer with signal conditioned, duty cycle modulated outputs, on a single monolithic integrated chip (IC) measuring 5 mm×5 mm×2 mm. Also, ADI's ADXL311 is a low cost, low power, complete dual axis accelerometer with signal conditioned voltage outputs, all on a single monolithic IC of dimensions of just 5 mm×5 mm×2 mm. In addition, ADI's ADXRS401 is a low-cost complete ultra small and light (<0.15 cc, <0.5 gram) angular rate-sensing gyroscope capable of measuring up to 75 degrees per second with all of the required electronics on a single chip.

WORKING EXAMPLE

Figure 3:
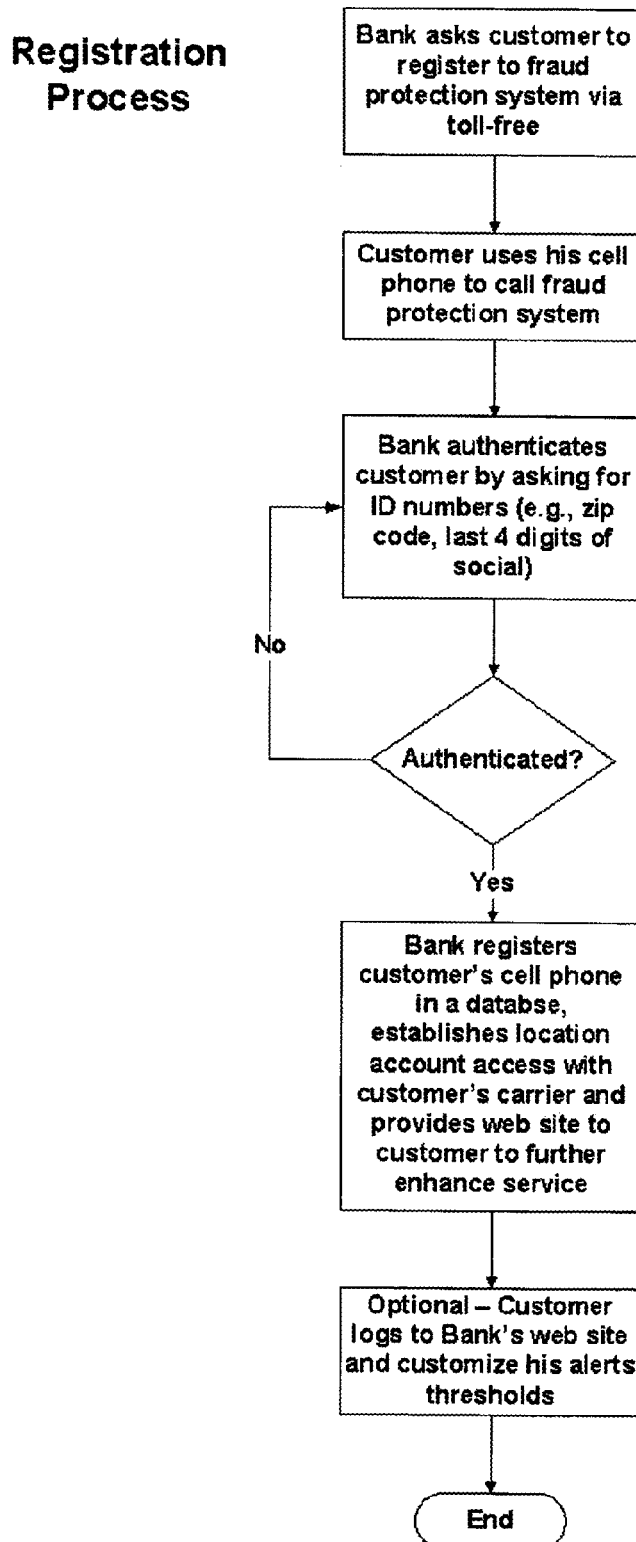
FIG. 3 shows a non-limiting example of a user registration process according to one aspect of the present invention.

The following is a non-limiting working example of a fifth embodiment of the present invention. A credit card customer agrees to be locatable via his or her mobile phone provider and registers a credit card or debit card (hereinafter "credit card") in such a manner that the user's credit card is associated with at least one mobile terminal. The process of registering a credit card in a Location-Based Fraud Protection ("LBFP") System involves a financial institution which partners with one or more mobile phone or wireless providers that provide mobile geographical location(s). A mobile phone provider agrees, usually for a fee, to release the location of a subscriber who, in order to comply with privacy laws, authorizes this action. The financial institution, using the LBFP system, can register its clients using the following method (as shown in FIG. 3): sending a letter or calling the client, and requesting the client to call a toll-free number from his cell phone. Using the caller's ID, the LBFP system will require at least two identifying numbers. These identifying numbers can be the last 4 digits of the credit card and the home address zip code. Once the customer enters these numbers, the LBFP system will communicate these details to the client's financial institution for verification.

For added security, the LBFP system can also challenge the client by sending a 4-digit SMS random number to the cell phone and asking the client to enter it using his phone keypad. If verified, the LBFP system will be able to associate the correct credit card with the customer's cell phone number. The LBFP system will then check to see if the client's cell phone carrier participates in this program. If it does, the LBFP will successfully add the client to its database (as described in the next paragraph) for credit card transaction monitoring. The LBFP system can then provide an optional unique PIN to the client so that he can access the LBFP web site to further custom the alerting logic. In turn, this customization can further increase the accuracy of the LBFP system. For example, the client can add known locations to be used when an online transaction takes place. Known locations can be a work address, relative/friend's address, etc. Using these addresses will increase the LBFP accuracy when a customer uses a credit card online by comparing known locations with client's cell phone location at the approximate time of the online transaction.

The financial institution stores in a database the subscriber customer (hereinafter "subscriber") details. For example, the subscriber's first and last name (stored as a type UTF-8 characters), Mobile carrier/Wireless provider code (e.g., Sprint-1, Nextel-2) stored as type Integer number, 10-digit Mobile phone number (3-digit area code and 7-digit phone number, stored as type Integer number), and ID number that is associated with the financial institution's subscriber's ID number (stored as type Integer number), such cross-reference number acting as a security measure whereby no personal information (SSN, credit card number) is stored in such database.

After registration, each time a subscriber uses the credit card, at the time of a purchase transaction or near to that time, the financial institution will contact the LBFP System servers via a secure encryption link (e.g., SSL/SSH/VPN). With no personal information of the subscriber being transmitted, the financial institution provides the date of transaction, time of transaction, address of the business where the transaction took place, type of transaction (online or physical) and the subscriber's ID number. The LBFP servers will then initiate a request via secure TCP/IP link (e.g., SSL/SSH/VPN) to the subscriber's mobile phone provider requesting the subscriber's post-transaction location, heading and/or speed (see FIG. 4). The actual physical location of the LBFP System does not matter. The LBFP System can be located on the financial institution's premises or at a distance therefrom. If at a distance from the LBFP System, the financial institution can be linked to it via a secure network link (e.g. VPN/SSh/SSL).

When the client uses his or her credit card, the LBFP System receives the purchase information from the financial institution, it cross-references the identifying item from the financial institution with the subscriber's unique carrier ID (e.g., cell phone number).

After the LBFP System finds the subscriber's unique carrier ID (or related information), it will then request the subscriber's last known location from the subscriber's carrier. Each carrier has specific means for interfacing with and providing this information. It is sometimes called API, which are known programming methods to execute specific functions. As a practical matter, the LBFP System, or the financial institution, will create a relationship and interface with the carrier ahead of time in order to obtain this information electronically. The LBFP System can interface with multiple carriers and multiple financial institutions.

There are at least four possible outcomes from the application of the above procedure, namely, (1) unable to locate the cell phone (cell phone out or range, turned off, or other reason that the cell phone cannot be located), (2) able to locate the cell phone—the cell phone is not at home, work or other known location, (3) able to locate the cell phone—the cell phone is at home, work or other known location, the "known location" being the location, in addition to client's home address, where the client usually resides (i.e., work, family addresses), these locations are optional and normally would be entered by the client at registration (see registration process above for more details), (4) able to locate phone with a timestamp prior to the purchase or transaction time.

With respect to each of the at least four possible outcomes, a decision (score) table is created using at least the parameters: $\Delta D$=distance between Location of Mobile phone and Location of Purchase Point, and $\Delta T$=difference between Time located phone and Time of transaction, among potential parameters. The LBFP system may use additional factors to arrive at a final score/Fraud Confidence Level ("FCL"). These factors include a client's heading, speed, urban type/density, time of day, day of week, weather conditions, etc. As to $\Delta D$, the time can range from 0 to 30 kilometers or more. As to $\Delta T$, the time can range from 0 to 30 minutes or more. Depending upon the sensitivity desired for questioning whether a credit card purchase is valid, Fraud Confidence Level ("FCL") values are assigned within the LBFP System for each credit card transaction. When an FCL is calculated by the LBFP System to be above a threshold value, a flag will be raised as to a valid transaction. Alternatively, when an FCL is calculated by the LBFP System to be below a threshold value, a flag is raised as to a potentially fraudulent credit card use.

For example, in the case of outcome (1), if the wireless provider is unable to locate the cell phone (no coverage, turned off, etc.), the LBFP System will switch into "search mode" as follows: (a) the system will keep attempting to locate the cell phone every 10 minutes for the next 30 minutes, or (b) if the location is determined within 30 minutes after the purchase transaction took place, the LBFP system will calculate the distance between the purchase location and the mobile phone location using an exemplar Table 1 to determine an FCL.

TABLE 1 scoring example

| If the location of cell phone is within a distance (Km) of the purchase point and within 20 minutes of the transaction | The LBFP System tags the transaction with an FCL of |
|---|---|
| ½ | 3 |
| 1 | 4 |
| 5 | 5 |
| 10 | 6 |
| 15 | 7 |
| 20 | 8 |
| 25 | 9 |
| >30 | 10 |

In the case of outcome (2), if the LBFP System was able to locate the cell phone, though the cell phone is not at home, namely, the location of the cell phone was found within 10 minutes after the purchase transaction took place and the purchase type is physical (not online/Internet), the LBFP System will calculate the distance between the purchase location or sale point and the mobile phone location using an exemplar Table 2 to determine an FCL.

TABLE 2 scoring example

| If the location of cell phone is within a distance (Km) of the purchase point and within 10 minutes of the transaction | The LBFP System tags the transaction with an FCL of |
|---|---|
| ½ | 3 |
| 1 | 4 |
| 5 | 5 |
| 10 | 8 |
| >10 | 10 |

In the case of outcome (3), the LBFP System will calculate the distance difference between the customer's known home, work or other known address and the location of the cell phone. If the LBFP System was able to locate the cell phone with the cell phone being at the above known locations, within 10 minutes after the purchase transaction took place AND the purchase type is online/Internet, the LBFP System will calculate the distance between the above known locations and the mobile phone location using an example Table 3 to determine an FCL.

TABLE 3 scoring example

| If the location of cell phone is within a distance (Km) of the purchase point and within 10 minutes of the transaction | The LBFP System tags the transaction with an FCL of |
|---|---|
| ½ | 4 |
| 1 | 5 |

TABLE 3-continued scoring example

| If the location of cell phone is within a distance (Km) of the purchase point and within 10 minutes of the transaction | The LBFP System tags the transaction with an FCL of |
|---|---|
| 5 | 6 |
| 10 | 8 |
| >10 | 19 |

In the case of outcome (4), a customer purchased goods or service from a physical location (e.g., store) and the LBFP System is unable to locate the cell phone. There may be situations whereby the wireless provider was able to acquire the customer's location prior to the purchase and store it in a temporary database. If the timestamp is close to the purchase time and the LBFP system is unable to get a newer location fix, then, in that case, the LBFP system may use the cached location information and ΔT to calculate the FCL using a scoring table similar to Table 1. The cached location information can be either the location information stored on the location server or on the MT.

In addition to the above data, the LBFP system may use additional factors in order to calculate the LFC/fraud score. These factors may be: time of day, day of the week, urban make (a suburb vs. downtown), weather conditions and traffic condition, among others. This is true for all possible scenarios.

With respect to an online purchase, such as a purchase from the online company Amazon.com™, the LBFP System may either know in advance, or at the time of the purchase, the frequent or usual address of the purchaser, for instance, home, work or other known location. The configuration and customization can be defined both globally as a system-wide rule and on per individual basis when the subscriber registered for this service. Customization can include scoring/LFC threshold, known locations, and client notification methods (e.g., SMS, email).

In the case of wireless network, GPS enabled cellular phones require, for the most part, a clear line of site with the sky in order to acquire GPS location. Since that does not always happen (in case the cellular phone is in the subway or other obstructed location), the location of the cellular phone sometimes does not match the exact location of the business. That is the reason the LBFP System compares both locations within a radius of X miles from such locations. (The number of X miles will be determined once an LBFP System in a particular environment has been through beta testing and becomes operational). The X miles factor is also expected to vary in various geographical locations, such as rural locations versus large cities. Note also that there are cellular phones that can be located with means other than GPS. An example is the triangulation of the cellular phone's signals with surrounding cell towers. For another example, the geographic location of a cell phone tower being used by a cell phone may be acquired by associating the cell phone tower ID, which is software accessible, with its geographic location. To the LBFP System, the manner by which the carrier obtains the mobile phone's location does not matter. The LBFP System will take into account parameters provided by the carrier such as heading, speed, acquisition-time and location error (accuracy).

Transaction Geographical Data ("TGD") is the transaction geographical information provided to a system for anti-fraud analysis. Non-limiting examples of such information include mobile voice device information such as mobile voice device number, mobile voice device MAC address, mobile voice device SSID, mobile voice device computer signature (defined as "PC Signature" in International Patent Application WO/2008/147353), mobile voice device Wi-Fi™ information, and mobile voice device IP address. Such TGD can also include other information which is not installed on such mobile voice device, such as the router in path to such mobile voice device, the router's IP address, HTML5 location information, the router's MAC address, and the router's Wi-Fi™ information. Other information can be billing and shipping address, POS (Point Of Sale) location, or other unique store information. Such geographical information is gathered during the transaction and can be saved in association with the mobile voice device information locally on the mobile voice device, or alternatively saved in a database by the vendor. Saving the geographical information in association with the TGD will improve security, as a potential fraudster cannot know which information is saved in association with the geographical information. This will make it harder for a potential fraudster to copy the information and impersonate a legitimate consumer making a legitimate purchase.

The practitioner may establish a maximum acceptable "safe distance" between the Internet user's mobile phone and Geo IP. Geo IP is the geographic location of the Internet Protocol. Such data is provided by one or more Geo IP information providers such as Maxmind™ and Quova™. Such Geo IP data provided by such providers is not as accurate as the mobile voice device location information, and in most cases it is accurate to the city level only, not the zip code or neighborhood. Therefore, using Geo IP from at least two separate Geo IP providers and automatically selecting the closest Geo IP to the mobile phone will be preferable. Once the closest Geo IP is selected, the authentication service can proceed on various paths:

Check the distance between TGD and Geo IP against one or more predetermined distances.

Check if the distance between TGD and Geo IP is within "Phone Accuracy" where such "Phone Accuracy" is provided by the carrier; and Check if the distance between TGD and Geo IP is within "Phone Accuracy" and one or more predetermined distances. Examples of predetermined distances are the "Inner Radius" and "Outer Radius" as described further below.

For option number 1, the practitioner may establish a maximum acceptable safe distance between the mobile phone and geographic coordinates provided by the Internet user. The Internet user's mobile voice device can provide coordinates from sources such as HTML5, Geo IP or address converted to coordinates, or provide a list of MAC addresses, Wi-Fi™ SSID or other data of other wireless devices located near the Internet user's mobile voice device, such as TGD information.

Similarly, the practitioner may establish maximum acceptable safe distances between the Internet user's cell phone and the billing address and/or shipping address associated with the transaction in question. A problem with this approach is the potential for high false positive and inaccurate results, since the predetermined number is a set number, not a dynamic number. Transactions made in rural environments will have different accuracy than transactions made in major city areas. In addition, environmental factors that are not due to the current mobile voice device location may also have a major effect on the phone accuracy. For example, locating a mobile voice device at 1:00 PM might provide accurate results, while locating the same mobile voice device at the same location at a different time might provide les accurate results, perhaps 2 miles away from the location determined at 1:00 PM. This may be due to the number of concurrent users using the same carrier's resources at the same time at the same location. Therefore, relying on a single predetermined distance may cause many false positives.

For option number 2, "phone accuracy" is a measure of the likely radius of the phone location as provided by the carrier. The accuracy value is a measure of accuracy as well as a statement of probability, sometimes both "estimated error" and "confidence" values are provided. Solutions in the carrier space have generally settled on a "one sigma" (67.7%) confidence factor, meaning that a location reported as "within 0.5 mile" of the actual location has a confidence level of 67.7% (i.e., one sigma). That means there remains a smaller probability that the device could be more than 0.5 mile away from the displayed location. The phone accuracy is affected by the method used to locate the phone; for example, GPS, Antenna Triangulation, and Cell ID each have strengths and weaknesses in terms of precision and accuracy. Phone accuracy may accordingly depend on the number of antennas the phone connects with, and/or the exposure of the phone to satellites at the time of the location inquiry.

In cases where the phone is located using GPS or more than three antennas, the phone accuracy will be high, and reported, for example, within a 0.1 mile radius. This means there is a confidence level of one sigma (67.7%) that the phone is within a radius of 0.1 mile of its reported location. In areas with many antennas in close proximity to the phone, such as in a city, the phone accuracy can be as low as 0.1 mile because the phone will often be triangulated by three or more antennas at the same time. In rural areas the phone may be located using one antenna, and/or the user may be far from that antenna, with poor reception, resulting in phone accuracy as low as 2.5 miles. i.e., with a confidence level of one Sigma, the phone is within a radius of 2.5 miles of its reported location. The phone accuracy is dynamic information provided by the carrier for every transaction. The phone accuracy or "location error" by some of the carriers. such information is very valuable when identifying potentially fraudulent transactions using the mobile voice device location information and phone accuracy may reduce false positive by assessing more accurately where the phone may be at the time of the transaction.

Using the phone accuracy together with the transaction information will increase the confidence level of the practitioner. For example, if the phone accuracy is 0.1 mile and the distance between the mobile voice device and the TGD is 2 miles then this may be a fraudulent transaction, whereas if the phone accuracy is 2.5 miles and the distance between the mobile phone location and the TGD is 2 miles then this may be a safe transaction.

Option 3 may use the phone accuracy as in option number 2, in combination with at least two radiuses. For example, the practitioner may set acceptable safe distances between the mobile phone and TGD for five geographical parameters: IP Address, Coordinates, Billing address, Shipping address and Historic IP. Each parameter may have two safe radiuses: an "inner radius" and an "outer radius". The inner radius is the first preferred safe distance between the mobile phone and one of the parameters. The outer radius is the largest radius within which the mobile voice device can be located and the transaction be categorized as safe. The reason for using two radiuses is the inaccuracy of mobile voice device location methods, and the number of scenarios this anti-fraud system will protect against.

For example, having a mobile voice device within the outer radius can indicate a safe transaction if the mobile voice device is 20 miles away from the IP address, when the distance between the mobile phone and the home address is more than 1,000 Miles. This permits the system to adapt to situations where the Internet user is traveling, making the imprecision of the geographical location of the mobile device less relevant. Thus, using a combination of the phone accuracy with at least two radiuses will decrease the incidence of false positives and increase system efficiency. For example, if the mobile phone accuracy is 2 miles while the inner radius is 1 mile and the distance between the mobile phone and one of the TGD parameters is 1.9 miles, that transaction is within the phone accuracy and therefore could be flagged as a safe transaction.

The "Historic IP" is a Geo IP database built using historic transaction information associated with the Internet user's mobile voice device and geographic transaction data such as a home address, billing address, shipping address, and HTML5. The Internet user's IP address, billing address and mobile voice device geographical information, taken together, enable the determination of the likely geographical location of the IP address. For example, if the Internet user is making a safe transaction from his residence, and the mobile phone is located near the residence (within, for example, 1 mile), then it is possible to use the geographical location of the mobile voice device and the residential address to determine the location of the IP address of the Internet user. If the Internet user makes a transaction while located 1,000 miles away from the billing address, and the distance between the user's mobile voice device and the IP address being used is within s safe distance (e.g., 20 miles), then it is possible to assign the location of the mobile voice device to the IP address.

In alternative embodiments, it is possible to use only one of the mobile voice device or billing address locations, and assign that location to the IP address; in other embodiments it is possible to use a combination of both locations, in a simple or weighted average, to indicate the location of the IP address.

In another embodiment, the practitioner may detect that more than one Internet user are using the same Internet IP address or the same router, but using two different mobile phones, and employ a geographical average of the locations of the two mobile voice devices, and then assign the geographical average to the location of the router IP address.

In one embodiment, safe distances may be modified to account for rural settings. For example, if the acceptable safe distance between the mobile phone and the IP is 5 miles, an additional fraction (e.g., 20 percent) might be added when the device and/or IP are in a rural area, so that the safe distance between one of the IP addresses and the mobile phone becomes 6 miles.

As mentioned above, the accuracy value is both a measure of accuracy as well as a statement of probability, and sometimes both "estimated error" and "confidence" values are provided. If the location is reported within a given radius, with a confidence of 67.7%, there is a probability that the device could be more than the stated radius away from the location reported. Therefore, in certain embodiments, the practitioner may add to the phone accuracy an additional fraction (e.g., 35%) in order to catch transactions where the phone location is more than one sigma from the reported location, for example where the reported phone accuracy is 1.2 miles but the actual distance of the device from the reported phone location is 1.5 miles. Thus, while the practitioner may set the acceptable safe distance between the mobile phone and the IP location at 5 miles, if the phone accuracy is 1 mile it may be desirable to add, e.g., 1.35 miles to the acceptable inner radius.

A "receiver" as used in the current application shall mean any device with an ability to receive wireless information from mobile voice device, credit card tap or any other device that can send information via wireless communication to such receiver. The receiver may store such information locally or on a remote database. It is possible to capture the wireless information of other devices by using sniffer, such sniffer can provide wireless information such as device information, Mac address and SSID. By using sniffer in monitor mode the SSID filter is disabled and all packets of all SSID's from the currently selected channel are captured. When capturing traffic in monitor mode, one can capture on a single, fixed channel, therefore, using multiple wireless adapters while each adapter capture a different channel, or capture while hopping through multiple channels (channel hopping). Examples of a receiver include a router, wireless credit card readers, wireless credit card tap, mobile voice device, laptop computer, POS terminal with wireless capability, ATM terminal with wireless capability, merchant wireless terminal, computer with wireless capability, a server with wireless capability or any other device modified or designed to receive wireless information. Such receivers can be located in any place such as a mall, store, shopping center, POS, ATM, Banks, house, apartment, public area, private area, office, buildings, etc.

"Tap & pay" transactions can be secured by any of the means described above, but because of the relative speed of such transactions, accelerated methods are desirable. Such accelerated means are provided by the embodiments described below.

As used herein, "Short Distance Wireless Information" ("SDWI") shall mean any mobile voice device information that is broadcast wirelessly to a short distance for transfer of information from a mobile voice device to a second wireless device such as a receiver, where such receiver and such second wireless device are not operated by the carrier, whether such transfer of such information initiated automatically or triggered by the person who owns such mobile voice device. Such information is typically transferred via short-range wireless technology such as Bluetooth™, Wi-Fi™ or RFID, and contains information associated with that mobile voice device or with the person who owns and/or is holding such mobile voice device. Examples of such SDWI include, but are not limited to, Wi-Fi™ MAC address, Bluetooth™ MAC address, IMEI, Serial Number, ICCID, and other information associated uniquely, or non-uniquely, with that mobile voice device. Additional examples include encoded personal identifying information, such as a cardholder's name, address, passport information, Social Security number, credit card number, phone number, and pertinent account or employee information. Non-unique information broadcast from such mobile voice device may include the device's carrier, brand and model, and the user's gender, nickname, profession, and personal preferences such as hobbies, sports, favorite foods, product preferences, and the like.

Electronic tap & pay transactions can be secured by using SDWI that is broadcast (either automatically or triggered) from the mobile voice device of a client while the owner of the credit card information and the mobile voice device are the same. Automatically broadcast means that the information is constantly broadcast, and triggered broadcast means that the information is broadcast only upon a certain action, such as pressing a button or tapping an RFID-equipped device near an RFID receiver. For example, if a client using a tap & pay credit card to conduct a transaction is also in possession of a mobile phone such as an iPhone™, the iPhone™ may be automatically broadcasting SDWI. The merchant can detect the SDWI using the same device that received the credit card tap information, or can use one wireless receiver to receive the electronic tap information and a second wireless receiver to get the SDWI. The merchant may associate such secondary wireless information with the electronic tap information that the merchant received from the same client.

Such security is not limited to point of sale only, and it can be used to secure Internet transactions as well, wherever the SDWI can be collected by receivers within range of the short-distance transmissions (such as nearby computers and routers.)

For Internet transactions it is possible to identify SDWI originating from a different device than the mobile voice device. For example, identifying the SDWI from the same device over the Internet can be done by software loaded on such mobile voice device, which detects and reports the MAC address of the mobile voice device. Such software can also detect SDWI broadcast by other devices, such as the MAC address of a printer, a different mobile voice device, a laptop computer, or a TV or other home appliance that broadcasts such SDWI to the mobile voice device. Alternatively, or in addition, a computer with a wireless connection can be used capture the mobile voice device SDWI of an Internet user.

For example, software can be installed on a neighbor's device, such software having the capability to connect to a wireless receiver such as the device's Wi-Fi™ network adapter or alternatively to a wireless router. Using the neighbor's Wi-Fi™ adapter or router such software will then be able to use such neighbor's receiver to capture a nearby Internet user's mobile voice device SDWI, and transfer such SDWI directly (or via an intermediary) to the online vendor in order to authenticate the Internet user's geographical location. Such SDWI can be captured at or near the time the Internet user is making the transaction with the online vendor. Alternatively, a designated receiver can capture such SDWI and transfer such information to the vendor. One non-limiting example can be a wireless router located near such Internet user and transferring the SDWI to such online vendor, or to an intermediary that can then transfer location information to such online vendor. Such software or designated hardware may be provided by the vendor, as part of a registration process engaged in by the neighbor with the vendor, or it may be provided by an intermediary (e.g. a bank or credit card company) or an internet data aggregator. Software for SDWI capture may optionally be built into a browser or a browser add-on. It may also be built into the operating system of the computer, where its functions can be called on by other applications, and/or it may be built into a router's firmware.

The environment of the average consumer today, whether at home, at work, or in a commercial setting, is filled with a wide variety of digital radio-frequency transmissions, many of which can be detected and interpreted by wireless computing and communications devices. All of this environmental data can be utilized by the methods of the present invention as SDWI. By collecting together multiple pieces of such SDWI, it is possible to create a "wireless fingerprint" or "wireless signature" for a given physical location or an Internet user identification, which can help distinguish secure transactions (in which, for example, the mobile voice device is near the location of such wireless signature) from transactions that require additional identification (in which the mobile voice device is not near such wireless signature.) Wireless signatures can be made more accurate by incorporating the signal strengths of multiple pieces of broadcast information, such as router MAC addresses, SSIDs, names, etc. Using such SDWI while the user is connected via the Internet, it is possible to know if the user is connected from a location having a known wireless signature. Such wireless signature location can be created by identifying at least one, and preferably a plurality, of SDWI from devices external to the device being used by the user to access the Internet.

For example, if an Internet user is connected to the Internet from home, it is possible to detect the printer's MAC address and the MAC address of the user's TV, or the SSID and/or MAC address of a neighbor's SDWI such as a router, and the signal strength of each one in addition to the Internet user's mobile voice device. The anti-fraud assessment at a POS using a wireless signature can be done by verifying that the SDWI information of a POS receiver is captured, checking the wireless signature of the POS, verifying that the SDWI information of the user's mobile voice device is captured, and comparing the wireless signature of the POS receiver to the wireless signature captured and reported by the user's mobile voice device. A scoring system can be employed, based upon the SDWI captured in the POS and the user's mobile voice device, and the signal strength of each source, to estimate the probability that the mobile voice device is located at or near the POS.

Scoring of a wireless signature can be done by giving more weight to MAC addresses, SSIDs or SDWIs which are repeatedly captured over a period of time. This method of "persistence weighting" takes into account the fact that a wireless signature is likely to evolve over time as certain transient devices in the area come and go, while other "persistent" devices are more permanent features of the environment, and do not often change. For example, the SSID of a neighbor's router may come and go, while those of a nearby university and coffeehouse are always present. Persistent ones could be weighted more heavily in a scoring system, as they are more reliably associated with a given physical location. The score is based in part on the fraction of previously-observed SDWI elements that are present at the time of the current transaction. In the example shown in Table 4 below, one Mac address has been seen for one month while two others have been seen for 35 and 30 months. Weighting the addresses linearly by persistence, the overall score of the wireless signature is 74. Table 4 is an example only; there are many possible ways to weight and score based on wireless signatures.

TABLE 4 scoring example

| Score | Months | Mac Address |
|---|---|---|
| 1 | 1 | 01-00-5e-00-00-r3 |
| 3 | 3 | 01-00-5e-33-00-r3 |
| 5 | 5 | 01-00-67-00-00-r4 |
| 30 | 30 | 01-00-6r-00-00-r3 |
| 35 | 35 | 01-00-5e-99-00-r3 |

One may also, for example, weight by reputation, so that the more fraudulent transactions that originate from a wireless signature, the lower the score such future transactions will get. In the example shown in Table 5, the overall wireless signature reputation score of the wireless signature will be −8, as two Mac addresses have been seen 4 times in 4 different fraudulent transactions. The practitioner may employ a combination of methods, and combine weighted wireless signatures with transaction histories and wireless signature reputations.

TABLE 5 scoring example

| Score | Fraud incidents | Mac Address |
|---|---|---|
| 0 | 0 | 01-00-5e-00-00-r3 |
| 0 | 0 | 01-00-5e-33-00-r3 |
| 0 | 0 | 01-00-67-00-00-r4 |
| −4 | 4 | 01-00-6r-00-00-r3 |
| −4 | 4 | 01-00-5e-99-00-r3 |

For example, a POS receiver may capture two different SSIDs broadcast by two different wireless routers. The information from the two routers may be received with different signal strengths. The combination of the two SSIDs and their respective signal strengths can form a wireless signature for the POS receiver at its current location. Comparing the corresponding information reported by a consumer's wireless communication device, i.e. the wireless signature of the device location, to the POS wireless signature will help authenticate the transaction.

An online entity such as an online bank, online security company or e-commerce site may choose to assign a "safe" score to an Internet connection that the Internet user has previously been associated with, as identified by the wireless signature associated with the connection. For example, the online entity may capture SDWI from the Internet user's mobile voice device MAC address and the MAC addresses of external devices, such as the user's home printer MAC address, if both the printer and the mobile voice devices broadcast MAC addresses. The combination of both SDWI and/or the MAC addresses of external devices, together may constitute a wireless signature.

Alternatively, the online entity may detect the SDWI or alternatively the MAC address of the mobile voice device via another Internet connection that is made from another device that is near such Internet user, such as a neighbor who is using his wireless computer and such wireless computer captures such SDWI of such first Internet user, while such Internet user is accessing the online vendor web site. Such capture by such neighbor can take place near the time of the transaction or after.

To secure transactions even more, it is possible to use Different Owner Wireless Information ("DOWI") from the client's mobile voice device, which is obtained from another source independent of the mobile voice device and such other source device is owned by a different owner than said mobile voice device. An example of DOWI is the mobile voice device geographical location, MAC address, phone accuracy, speed, direction or any other information provided by the carrier or other independent source about the mobile voice device. Another example of DOWI may be wireless information received from a separate receiver where the separate receiver is maintained by a different entity from the owner of that mobile voice device. Example for such entity maybe a neighbor of such Internet user, a merchant, or any other entity owning a wireless receiver where such wireless receiver is an independent source of information from the mobile voice device used by the user.

Using receivers that can capture SDWI, a merchant can know where a client is with high accuracy because the SDWI such as MAC addresses and SSIDs are not broadcast to a large area, but rather only within a small radius. Therefore a merchant or a group of merchants can spread routers throughout a commercial area, such as a store or shopping mall, and by capturing the SDWI such merchants can detect with high geographical accuracy where users are located, their walking speed and the direction. Such SDWI captured from two or more different receivers may increase system accuracy by identifying more accurately the mobile voice device geographical location. Using at least two receivers, some distance from each other, allows the receivers to determine the relative signal strengths and distances from the mobile voice device. Each receiver is located in a different location, and the distance from each receiver to the mobile voice may be different and thus each signal strength implies a different radius. Given at least two different distances from at least two different receivers, a triangulation process can reduce the common geographical location within which the mobile voice device may be located.

For example, given at least two receivers in the same street, one receiver located at the beginning of the street may capture SDWI from the mobile voice device with a very strong signal strength, while the second receiver, located at the end of the street, reports a very low signal strength from the same mobile voice device. This is sufficient information to conclude that the user is at or near the beginning of the street. If the first receiver located at the beginning of the street and the second receiver located at the end of the street both capture the same signal of the mobile voice device with medium and equal signal strength, the user is at or near the middle of the street.

The combination of automatically broadcast SDWI together with the DOWI can improve security for the vendor while reducing the time the user has to wait in order to complete the authentication. At present, it may take up to 30 seconds to locate the GPS geographical location of a mobile voice device by the carrier, from the time such location is requested by a merchant or aggregator until such geographical information or an authentication is provided to the merchant. Reducing that time will improve the service for that user, and may increase the use of such mobile voice device geographical information for anti-fraud assessment and authentication in places or systems that require completion of user authentication in less than one second. The methods of the present invention can be applied as soon as a receiver at a location identifies a client's mobile voice device, because SDWI is available as soon as the client enters a store or approaches an ATM and such client's mobile voice device is automatically broadcasting SDWI. Such receivers can automatically obtain such SDWI from such mobile voice device (such as MAC address) once such mobile voice device is near such receiver. The vendor or bank can identify the phone number associated with such SDWI and request the geographical location of such mobile voice device before the client has identified himself at the ATM or has handed over his credit card.

The vendor can request the mobile voice device location as soon as a receiver identifies the SDWI identification of a mobile voice device. This method will automatically push a request to find the client's mobile voice device location, even before the client initiates a transaction. It is possible to locate the receiver next to an ATM or store register, so that once the user is standing online next to such receiver, even before the client has handed over his credit card to the cashier, the receiver will capture the SDWI and request the mobile voice device location from the carrier, and it is possible to cache such geographical information of such mobile voice device even before the client hands over his credit card information, so that if the client does hand off the credit card information, the transaction verification will take place using such cached information. Alternatively, the vendor may complete the transaction automatically.

The invention accordingly provides a method comprising the following steps:

Step 1: A receiver captures the SDWI information of a mobile voice device before the owner of such mobile voice device has swiped or tapped his credit card information, or otherwise initiated a transaction, and transfers the SDWI information as well as the receiver's geographical information to an Anti-Fraud Assessment system;

Step 2: The Anti-Fraud Assessment System requests the mobile voice device location from the mobile voice device carrier/aggregator;

Step 3: The Anti-Fraud Assessment System receives from the carrier/aggregator the mobile voice device location information, and any available additional geographical information about such mobile voice device location, such as phone accuracy;

Step 4: After the mobile voice device owner has tapped or swiped his credit card at a POS/ATM, or has otherwise initiated a transaction, the Antifraud Assessment System checks that the mobile voice device geographical information received from the carrier/aggregator matches with the Receiver's geographical information; and Step 5: If the mobile voice device and the receiver's geographical information do not match, an anti-fraud action is taken, e.g., contacting the mobile phone by sending an sms message or a phone call; or, if the mobile voice device and the receiver's geographical information do match, the transaction is completed.

Once the geographical location of such mobile voice device is received, the vendor then checks that the location received from such carrier matches with the location of the receiver/ATM/POS; alternatively the 'phone radius'/'location error'/'phone accuracy' parameter from that mobile voice device carrier can be used in order to reduce false positive by verifying that the distance between such receiver and such mobile voice device is within the phone accuracy parameter provided from such carrier, and if that condition is met the locations are deemed to match. This can prevent transactions by a fraudster who is carrying a mobile device that has been modified to broadcast the MAC address of a legitimate customer. For example, while a client is standing in the register line at a store location, a receiver determines that the client's mobile voice device MAC address is near such register. The system checks a database for a mobile phone number associated with such MAC address. The system then requests from a carrier or an aggregator the mobile voice device location information. The system then checks that the mobile voice device location received from the carrier matches with the receiver/store location information, or that the mobile voice device location and the receiver/store are within the phone accuracy received from the carrier. For example, if the distance between the mobile phone and the receiver is 0.3 miles and the phone accuracy/location error received from the carrier is 0.5 mile, the phone and the receiver are within the phone accuracy distance. Another possible method can be by getting the mobile voice device wireless signature and checking it against the wireless signature of the POS/ATM/Receiver. To improve verification even more, it is possible to combine both methods: 1. Check the geographical information of the mobile phone as it received from the carrier against the geographical information of such POS/ATM/Receiver and 2. Check the wireless signature as it was received from the mobile voice device against the wireless signature of the POS/Receiver/ATM.

Another possible comparison can be between the receiver, the DOWI provided from the carrier and the wireless information captured from the mobile voice device.

For online users, an online vendor website at the first login can associate the Internet user's computer signature, IP address or any other network or computer identifier with a phone number or SDWI or the Internet user's account with such online vendor. An example of such an account can be an Amazon.com™ account, an Internet email account or an online bank account. Once such user connects for a second time to such web site, the web site can identify the computer signature/IP address and automatically request the phone location before such user starts the login process or identification process. Such first and second web site visits can be to the same web site or can be to two different web sites.

In one embodiment of the invention, a geographic comparison is made between the geographical location identified by the SDWI of a mobile voice device, as detected by a receiver, and a second geographical location of said mobile voice device provided from at least one other source independent from such receiver. Such other source may be, for example, the carrier or the owner or operator of a receiver. In this embodiment, the following steps are carried out:
  a. A receiver obtains mobile voice device SDWI from the device, such as Wi-Fi™ Bluetooth™ or MAC address, while such mobile voice device is within the range of such receiver.
  b. The geographical location of such mobile voice device is obtained from a second source that is independent from the SDWI. Such second source maybe a carrier, and may also provide additional parameters such as phone accuracy. Alternatively, such second source may be a software company while such mobile voice device contains software of such software company Example for such application can be "angry birds". Such software installed on such mobile voice device can provide additional information about the owner of such mobile voice device and about the device itself. Example for personal information can be: email address, contacts information, SMS information. example for mobile voice device information maybe: Mac Address, Phone Number, S/N, OS information, Wi-Fi™ address, Bluetooth™, IMEI, ICCID, carrier, Model.
  c. A geographical verification is made that the SDWI is within said phone accuracy distance from the geographical location of such receiver, to verify that the distance between the two locations is within a predetermined limit, or within the phone accuracy parameter.
  d. If the distance between the two locations is not within the phone accuracy parameter, the transaction is declined or another action is taken, like sending a message to the mobile phone owner.
  e. If the distance between the two locations is within the phone accuracy parameter or within the predetermine distance, the transaction is accepted.
  f. The transaction is completed.

In another embodiment, a geographic comparison is made between the geographical location identified by the SDWI of a mobile voice device, as detected by a vendor's receiver, and a second geographical location of said mobile voice device provided by at least one other source independent from the receiver, such as the carrier. In this embodiment, the following steps are carried out:
  a. A receiver identifies the tap information of one RFID tap device
  b. The receiver obtains mobile voice device SDWI from the device, such as Wi-Fi™ Bluetooth™ or MAC address, while the mobile voice device is near the receiver.
  c. The geographical location of such mobile voice device is obtained from a second source. Such second source is independent from such secondary wireless information. Such second source maybe a carrier.
  d. A comparison is made between the receiver's geographical location, as determined from secondary wireless information, to the second source geographical location, to verify that the distance between the two locations is within a predetermined limit, or within the phone accuracy parameter.
  e. If the distance between the two locations is not within the phone accuracy parameter, the transaction is declined.
  f. If the distance between the two locations is within the phone accuracy parameter or within the predetermine distance, the transaction is accepted.
  g. The transaction is completed.

Another embodiment comprises checking the location identified by a receiver which has obtained SDWI from a mobile voice device, and comparing such information with a second geographical location of said mobile voice device obtained from at least one other source independent from such receiver, such as the carrier, a neighbor, a merchant or other entity that is not the owner of the mobile voice device, and verifying that both locations are located within the phone accuracy information received from the carrier. In this embodiment, the following steps are carried out:
  a. A receiver identifies the mobile voice device SDWI, such as Wi-Fi™, Bluetooth™ or MAC address, while such mobile voice device is near such receiver.
  b. The geographical location of such mobile voice device is requested from a second source, such as a carrier, that is independent from the receiver location.
  c. A comparison is made between the receiver's geographical location and second source geographical location, to verify that the distance between the two locations is within a predetermined limit, or within the phone accuracy parameter.
  d. If the distance between the two locations is not within the phone accuracy parameter, the transaction is declined.
  e. If the distance between the two locations is within the phone accuracy parameter or within the predetermine distance, the transaction is accepted.
  f. The transaction is completed.

Yet another embodiment involves geographic comparison between a first location identified by a receiver, which has identified electronic tap information and SDWI from a mobile voice device, and a second geographical location of said mobile voice device, which is provided by at least one other source independent from such receiver (such as the carrier), and verifying that both locations are located within the phone accuracy information received from the carrier. In this embodiment, the following steps are carried out:
  a. A receiver identifies the tap information of one RFID tap device b. The receiver obtains mobile voice device SDWI from the device, such as Wi-Fi™, Bluetooth™ or MAC address, while the mobile voice device is near the receiver.

c. The geographical location of the mobile voice device is obtained from a second source that is independent from the receiver location, such as the carrier. Such second source also provides an additional parameter such as "phone accuracy".

d. A comparison is made between the receiver's geographical location and the second source geographical location, to verify that the distance between the two locations is within the phone accuracy parameter.

e. If the distance between the two locations is not within a predetermined limit, or within the phone accuracy parameter, the transaction is declined.

f. If the distance between the two locations is within the phone accuracy parameter or within the predetermine distance, the transaction is accepted.

g. The transaction is completed.

The mobile voice device SDWI can be utilized for purposes other than security. For example, a client carrying a mobile voice device may pass, with his mobile voice device, near a merchant's receiver. The receiver can automatically capture the SDWI from the mobile voice device. Since the receiver is located in a known location the merchant can know where such mobile voice device is geographically located. Once the receiver captures the SDWI, the merchant can access a local or remote database to request the client information associated with the SDWI. The merchant can choose to personalize a greeting, product, discount etc. based on the client's information and historic transactions. For example, an electronic sign in the window adjacent to the client can display "Welcome Mr. Smith, how I can help you?" just as Mr. Smith is walking past the merchant's store.

This is different from solutions provided by systems such as Tagtile™, which capture the wireless information only when a client has entered a store, and voluntarily tapped with his RFID-equipped mobile phone on a Tagtile™ receiver. The method of the invention automatically captures the mobile voice device SDWI without requiring the user to take any voluntary action, does not require RFID equipment, and can function even if the client hasn't entered the store. In addition, instead of installing a specialized application on the user's mobile voice device, it is possible to use applications that are already installed on such mobile voice device and communicate with such user via such installed applications.

Once the merchant captures the SDWI, he may need to translate that information into a person's name or a phone number. For example, the merchant may capture the MAC address, but a MAC address is not a phone number or a person's name. Therefore, in certain embodiments of the invention, the merchant will take at least one of the following actions:

a. Request from the carrier the phone number or contact information associated with the SDWI;

b. Query a database that contains the SDWI and associates it with the contact information; or c. Build such a database during the course of, or after, a purchase by the client.

By way of example, a person who buys a product provides his contact information, at about the same time that a receiver captures the SDWI associated with the person's mobile voice device. At this point the merchant possess the contact information and the SDWI of the mobile voice device, and can store the information and the association between the two (via the close timing of the data capture). When the user arrives at the same store (or another store using the same SDWI), the merchant will be able to automatically determine that the same person is entering his store, and possibly customize a message or take other actions based on what is known about the client's favorite products or other purchase habits. Another example may be a person downloading an application to his mobile voice device, wherein such application captures the SDWI, such as MAC address, and/or the persons contact information, such as a phone number.

Another possible method to associate a person's SDWI with the right person's contact information is by identifying the SDWI from two separate merchants or two separate locations. For example, the Merchant at location "A" may capture SDWI from 50 different devices, and in addition receive the contact information of 5 different people who have paid the merchant for a product. A second Merchant at location B may capture the SDWI of 100 people and receive the contact information of 10 different people who have paid the second merchant for a product. The contact information such merchants may receive may include, for example, the phone number, first and last name, billing address and credit card information.

By comparison of the received information in a shared database, the merchants can look for duplicated information such as SDWI and duplicated contact information, and associate the duplicated contact information with the duplicated SDWI based on the timing of the data acquisition. For example, Merchant "A" may capture SDWI, such as MAC address 11:11:11:11:11:11, and 50 other MAC addresses, and may also receive the client name John Doe with phone number 555-123-4567 while a client pays for a product. It is not known at this point that John Doe is associated with any particular MAC address. Merchant "B", at the same time or at a later time, may also capture as SDWI the MAC address 11:11:11:11:11:11 and an additional 100 other MAC SDWI, and Merchant "B" may also receive the client name John Doe with phone number 555-123-4567 while the client pays for a product.

Based on the example above, if none of the other 149 MAC addresses acquired at about the times of the two sales are duplicated, the merchants may associate SDWI MAC address 11:11:11:11:11:11 with John Doe and phone number 555-123-4567. Merchants "A" and "B" may be the same merchant at the same location, or at different locations, and may collect the information on different dates. If the same MAC address repeats twice while the same person's contact information is captured, the system can, with a useful level of confidence, associate the MAC address information with the person's contact information. A third transaction in which both the same MAC address and the same personal contact information are captured permits the system to assign a very high level of confidence to the association.

Additional information may help in narrowing and improving the SDWI sorting process, by identifying information such as the time the person who carries the mobile voice device with such SDWI enter the store, the time he exits the store, the location of the store. Such information about the location and timing of the SDWI helps associate the contact information of that person with the SDWI of his device. Correlations with other databases of other merchants, data obtained by the same merchant on different dates, or possibly information from other carriers, can identify the information received by the receivers such as purchase time, entry time of the mobile voice device to the store, exit time of the mobile voice device from the store. It is possible to combine such data from more than one receiver.

For example, with at least two receivers in the same or at different locations, the information received from a plurality of receivers may identify a friend, family or associate of such owner of such mobile voice device walking together with the owner.

For example, if two mobile voice devices enter the range of one or more receivers at the same time, by identifying two sets of SDWI (such as two different MAC addresses), it is possible to observe that the two different MAC address are moving from one side of the store to another side at the same time, or moving from one floor to another floor at the same time, or exiting the store at the same time. A combination of such observations may be used to conclude that the first mobile voice device is associated with the second mobile voice device, and by inference, that there is an association between the persons carrying the devices.

Because Wi-Fi™ signals have a relatively short range and by combining the information of at least two receivers at the same time, it is possible to know if a person is interested in one set of products or another. For example, it may be determined that a MAC address was detected continuously for 10 minutes in the women's clothing department, or even at a particular display of women clothing from a particular designer. The merchant can conclude that the owner of that mobile voice device is probably interested in buying women's clothing, and may be interested in clothing from that particular designer. This makes it is possible to target related marketing efforts, such as sales announcements, notifications of new designs and models from that designer, and even personalized discount offers, to that particular shopper. Additional technical details, obtained from the carrier or from the SDWI, such as phone model, screen size and resolution, may further refine the merchant's efforts, by ensuring that information sent to the shopper is properly formatted and will be properly displayed on the mobile voice device.

A Wi-Fi™ router can detect a mobile voice device MAC address while such mobile voice device passes next to that router. Converting that MAC address to a mobile voice device number, such as a mobile phone number, will allow the practitioner of the present invention to know when the mobile phone owner passes by the router. The practitioner can thereby obtain geographic location information without the need to query or otherwise communicate with the mobile voice device or its owner.

In general, the methods of this embodiment of the present invention comprise the steps of:
1. Capturing with one or more receivers SDWI from a mobile voice device;
2. Optionally, looking up in a database additional information associated with the SDWI; and
3. Taking action based on such SDWI and any such additional information.

It is generally desirable for a merchant to maintain good relations with customers, therefore in certain embodiments of the invention, the client may have software installed on his mobile voice device which enables him to communicate his level of interest in receiving offers and announcements from the merchant. The client, upon receiving a communication or offer related to a given product, can indicate that he has low or no interest, in which case communications and offers related to the product will be largely or completely discontinued. As an alternative to specialized software, the client may be given the opportunity to respond via a browser (by clicking on displayed buttons), or via SMS or email (e.g., by replying with a yes or no, or with a numeral corresponding to the level of interest.)

If the client indicates an interest in a product (for example, pizza), the merchant can update a central database, which will push the information to other merchants selling pizza or related products. Those merchants may then contact the client with their own announcements and promotions. Alternatively, a merchant whose receiver(s) have captured SDWI from a mobile voice device can query the central database, and inquire if the client associated with that SDWI has indicated an interest in products or services that the merchant is marketing. If the answer is yes, the merchant can contact the client immediately via the wireless device (e.g. via an SMS message, a message from software installed so such wireless device such as a pop up message, e-mail, or recorded telephone message), or via an in-store display, and present appropriate offers and announcements.

A number of companies (e.g., Google, Skyhook and Navizon) have mapped the geographical location of MAC addresses, SSIDs and IP Addresses, through the use of vehicles equipped with GPS and Wi-Fi™ antennas. These vehicles capture IP Addresses Wi-Fi™ MAC addresses and SSIDs as the vehicles are driven along the streets, and the IP Addresses Wi-Fi™ MAC addresses and SSIDs are geographically mapped according to the vehicles' GPS information. Google and Apple conduct similar mapping programs by tracking the movement of their handheld Android™ and iPhone™ devices.

There are significant limitations on this technique, which limit the accuracy of the mapping. GPS accuracy can be plus or minus 3 meters, which may not provide sufficient resolution to distinguish separate addresses in an urban environment, especially where the source of the Wi-Fi™ signal is at a distance from the receiver. Since the Wi-Fi™ broadcast distance is limited to a relatively small radius, there is also an inherent problem in mapping the Wi-Fi™ information of devices located in tall buildings from signals obtained at street level. In addition, such vehicles cannot drive on private roads, so that IP Addresses Wi-Fi™ MAC addresses and SSID located in homes on private roads cannot be mapped accurately, if at all.

The methods of the present invention make it possible to map IP Addresses Wi-Fi™ SSID, MAC addresses, computer signatures etc. with a much higher accuracy, because the methods use the actual address rather than the GPS location of a drive-by (or walk-by) receiver. The methods of the invention map Wi-Fi™ information, Geo IP and PC signature information automatically while interacting with an Internet user having a known geographical location (e.g. a home address). Accordingly, the methods of the invention provide highly accurate mapping at very low cost.

As used in the present application, "User's Geographical Information" or "UGI" refers to Geo IP, MAC address, SSID, computer/PC signatures SDWI or any other hardware or software information of an Internet user's mobile voice device, routers and other Internet and wireless devices which allow association of such information with geographical information. Examples of such devices include, but are not limited to, computers, printers, routers, laptops, tablets, or other devices communicating with the Internet which contain software or hardware identifiers.

As of today UGI providers such as Quova, Maxmind, Google, Navizon and Skyhook provide two-dimensional UGI map coordinates, but do not provide UGI height information. The methods of the present invention will allow major improvement in UGI accuracy and provide accurate height information as well.

Prior art systems and services for fraud assessment and prevention attempt to assign geographical information to UGI information. Such fraud assessment services already possess some of the UGI information, and it is therefore possible to assign such geographical information to UGI. The main limitation of prior art methods of assignment is not being able to know if the Internet user is indeed at the transaction location at the time such transaction takes place. Therefore, such assignment may be done with a much higher false positive if the mobile voice device is not being used for the transaction at the time of the transaction. The methods of the present invention use the UGI information and check the mobile voice device wireless location information in order to insure that the Internet user is indeed near the location we assign.

The online vendor gets TGD information (e.g., billing address, shipping address, IP address, PC Signature, Mobile voice device information, and HTML 5 geolocation), and in addition may obtain mobile voice device geographic and phone accuracy information from the carrier. Some or all of this TGD address information is then assigned to UGI information if the mobile voice device geographical location is within a predetermined distance from such address or within the phone accuracy distance.

As noted above, the "safe distance" between the mobile voice device and the billing address may be larger in areas outside a city, where antenna density is low and the user may be inside a house without GPS reception and far from cellular antennas. In such situations it is preferable to use additional information provided by the carrier, such as the phone accuracy (location error), instead of using a static predetermined number for the safe distance, and assign some or all of the TGD address information to the UGI information when the mobile voice device geographical location is within the phone accuracy distance from such address.

The above assignment decisions can be improved by checking other anti-fraud and historic information associated with the Internet user and/or the user's accounts, and assigning only in cases where the antifraud assessment approves the transaction. Such other anti-fraud and historic information may be, for example, computer signature, fraud score and "out of band" verification. Examples of out of band verification are methods that involve contacting the user, such as sending a 4 digit PIN number SMS to the user's mobile voice device and requesting the user to enter these 4 digits in a web site or application, calling the Internet user via IVR system and requesting the user to press "1" to complete the transaction, or asking the user to provide personally identifying information, such as the brand of car he purchased, school information, insurance information, etc.

Billing information can optionally be edited to assign to the UGI only geographic data, such as state, city, street, street number, zip code and elevation. The elevation may be estimated by the apartment number. For example, if the address includes the apartment number 7B, it is possible to multiply the floor number by an average height per apartment (say, 3 meters) and assign an elevation of 21 meters above street level to the UGI.

By way of example, the methods of the invention provide for the following steps:
a. Presenting to an Internet user an online vendor web site, and via that web site:
b. Receiving the IP address of the Internet user's Router (e.g., 66.65.63.155) while the Internet user is using the Router to communicate with the web site.
c. Receiving from the Internet user an order for a product or service, and receiving said user's billing address, shipping address, and mobile voice device phone number, either from the user or from an internal or external database.
d. Requesting from the Internet user permission to locate his mobile voice device.
e. If said permission is received, requesting and receiving the Internet user's mobile voice device geographical information/coordinates, along with any available phone accuracy or phone location error information. (Such location can be done using the carrier provider of such mobile voice device, via HTML 5 wireless location information, or via any other method known today or in the future to locate mobile voice device geographical location via wireless technology.) In this example, the phone accuracy/phone location error is 0.19 mile and the phone location is 40.7115, −74.0163.
f. Calculating the distance between the mobile voice device and the billing address. In this example the distance between the coordinates and the billing address is 0.07 mile.
g. If the distance between the mobile voice device and the billing address is less than the phone accuracy, concluding that the Internet user is at the billing address, and completing the transaction.
h. If the distance between the mobile voice device and the billing address is greater than the phone accuracy, concluding that the Internet user is not at the billing address, and either declining the transaction or requesting additional information to validate the identity of the user.
i. Assigning to the received IP address (in this example, 66.65.63.155) the geographical location of the billing address, and assigning an elevation if the address includes a floor or apartment number, or if elevation information is received from the carrier/aggregator.
j. Optionally, translating such billing address to map coordinates, and assigning the coordinates and elevation to the IP address.

The above example demonstrates assignment of some of the billing information to an IP Address used by an Internet user to access an online vendor web site, with the online vendor using the mobile voice device and phone accuracy to increase the confidence level and reduce false positives. The method can assign some of the billing information in the same manner to other UGI information, such as Wi-Fi™ MAC address (and signal strength), Wi-Fi™ SSID (and signal strength), any other Wi-Fi™ identifier, any WiMAX identifier, Computer Signature or any other software, hardware or network identifier of such Internet user or Internet user's mobile voice device.

The Geo location of one UGI can be assigned to another UGI. For example, the Geo IP 66.65.66.11 with Geo location of the billing address in the example above can be further assigned to a Wi-Fi™ MAC address or SSID. Alternatively, the Geo location of the IP address can be assigned to a wireless signature that may include multiple pieces of Wi-Fi™ information and their reception quality (signal strength), for example the SSIDs or MAC addresses of nearby wireless routers or printers.

Other example is assigning the Geo location of the IP address to computer signature. Such identification can take place while such information is provided to a Geo calculation system that does not contain geographic information on some of the UGI information. For example the information provided to Geo calculation system may include location information of the Geo IP, but may not include Geo location information on the Wi-Fi™ information or the computer signature or any other UGI information. In such cases the Geo calculation system may assign the geographical location of one UGI to another UGI. Example the Geo calculation may contain the new and updated Geographical location of the IP Address but do not contain a new and accurate Geo Location of the Wi-Fi™. It is therefore possible to assign such new and accurate geo location of the IP to the Wi-Fi™ information, SSID, Mac Address etc'

In practice, it may be necessary to reduce the high address accuracy provided by the methods of the present invention to the building accuracy, neighborhood accuracy, zip code +4 or zip code, in order to comply with privacy regulations.

The invention has been described herein with reference to particular exemplary embodiments. These exemplary embodiments are meant to be illustrative, and the invention is not limited to the examples provided. Certain alterations and modifications will be apparent to those skilled in the art, without departing from the scope of the invention. Accordingly, the scope of the invention is limited only by the appended claims.

We claim:

1. A method for authenticating a transaction associated with a user's identity, where the user is associated with a mobile phone, and the transaction is associated with a time and location, comprising the steps of:
   (A) receiving a cached pre-transaction location of the mobile phone and a time associated with the cached pre-transaction location, wherein the cached pre-transaction location of the mobile phone is identified by one or more of the following: GPS, Wi-Fi, antenna triangulation and cellular base station, and wherein said cached pre-transaction location is received from the mobile phone;
   (B) checking if said cached pre-transaction location has not been updated within a predetermined time period;
   (C) if the cached pre-transaction location has not been updated within the predetermined time period, then receiving another location of said mobile phone, wherein said another location is received from the mobile phone, and wherein said another location is from a time period after the pre-transaction location of the mobile phone, wherein said another location is identified by one or more of the following: GPS, Wi-Fi, antenna triangulation and cellular base station; and either
   (D) preventing the transaction if a calculated speed is greater than a predetermined value, wherein the calculated speed is calculated from:
      (i) a time difference between the time associated with the transaction and the time associated with said another mobile phone location;
      (ii) a distance between the transaction location and said another mobile phone location; and
      (iii) the speed required to travel the distance in the time difference;
   or
   (E) allowing the transaction if the calculated speed is not greater than the predetermined value.

2. The method of claim 1, further comprising the step of, prior to the transaction, requesting the user's authorization to be located via the mobile phone, wherein the user's authorization is provided prior to the transaction.

3. The method of claim 2, further comprising the step of associating the mobile phone with the identity of said user, wherein said association is created after a successful verification of said identity.

4. The method of claim 3, wherein said successful verification comprises:
   (i) sending to the mobile phone a message comprising a random number, and
   (ii) receiving from the mobile phone a message comprising said random number.

5. The method of claim 1, wherein said identity is a credit card number, and wherein said credit card number is entered via the mobile phone.

6. The method of claim 5, further comprising the step of associating the mobile phone with the credit card number of said user, wherein said association is created after a successful verification of the mobile phone number.

7. The method of claim 6, wherein said successful verification comprises:
   (i) sending to the mobile phone a message comprising a random number, and
   (ii) receiving from the mobile phone a message comprising said random number.

8. A method for authenticating a transaction associated with a user's identity, where the user is associated with a mobile phone, and the transaction is associated with a time and location, comprising the steps of:
   (A) prior to the transaction, receiving the identity, wherein said identity is entered via the mobile phone;
   (B) associating the mobile phone and the identity, wherein such association takes place after successful verification of the identity and of the mobile phone;
   (C) receiving a pre-transaction location of the mobile phone and a time associated with the pre-transaction location, wherein the pre-transaction location of the mobile phone is identified by one or more of the following: GPS, Wi-Fi, antenna triangulation and cellular base station, wherein said pre-transaction location is received from the mobile phone; and either
   (D) preventing the transaction if a calculated speed is greater than a predetermined value, wherein the calculated speed is calculated from:
      (i) a time difference between the time associated with the transaction and the time associated with the mobile phone location;
      (ii) a distance between the transaction location and the mobile phone location; and
      (iii) the speed required to travel the distance in the time difference;
   or
   (E) allowing the transaction if the calculated speed is not greater than the predetermined value.

9. The method of claim 8, wherein said successful verification comprises:
   (i) sending to the mobile phone a message comprising a random number, and
   (ii) receiving from the mobile phone a message comprising said random number;
and wherein the identity is entered via the mobile phone.

10. The method of claim 9, further comprising the steps of: prior to the transaction, requesting the user's authorization to be located via the mobile phone, wherein such user authorization is provided prior to the transaction, and wherein said pre-transaction location has been updated within a predetermined time period.

11. The method of claim 8, wherein said pre-transaction location of the mobile phone is cached, and wherein the time associated with the pre-transaction location is within a predetermined time period.

12. A method for authenticating a transaction associated with a user's credit card number, where the user is associated with a mobile phone, and the transaction is associated with a time and location, comprising the steps of:
- (A) receiving the credit card number associated with the user;
- (B) associating the mobile phone and the credit card number;
- (C) receiving a pre-transaction location of the mobile phone and a time associated with the mobile phone location, wherein the mobile phone location is identified by one or more of the following: GPS, Wi-Fi, antenna triangulation and cellular base station, wherein said pre-transaction location is received from the mobile phone; and either
- (D) preventing the transaction based on the results of calculation where a calculated speed is greater than a predetermined value, wherein the calculated speed is calculated from:
  - (i) a time difference between the time associated with the transaction and the time associated with the pre-transaction mobile phone location;
  - (ii) a distance between the transaction location and the pre-transaction mobile phone location; and
  - (iii) the speed required to travel the distance within the time difference;
  or
- (E) allowing the transaction if the calculated speed is within the predetermined value.

13. The method of claim 12, wherein said association between the mobile phone and the credit card number is created after a successful verification of said mobile phone by a bank, wherein said bank is associated with said credit card number, and wherein said credit card number is entered via the mobile phone.

14. The method of claim 13, wherein said successful verification comprises:
- (i) sending to the mobile phone a message comprising a random number, and
- (ii) receiving from the mobile phone a message comprising said random number.

15. A method for authenticating a transaction associated with a user's identity, wherein the user is associated with a mobile phone, the transaction is associated with time and location, and the identity is associated with a bank, comprising the steps of:
- (A) prior to the transaction, receiving the identity and communicating the identity to the bank associated with said identity for verification;
- (B) upon successful verification of the identity by the bank, associating the mobile phone and the identity;
- (C) receiving a pre-transaction location of the mobile phone and a time associated with the pre-transaction location of the mobile phone, wherein the pre-transaction location of the mobile phone is identified by one or more of the following: GPS, Wi-Fi, antenna triangulation and cellular base station; and either
- (D) preventing the transaction based on the results of calculation where a calculated speed is greater than a predetermined value, wherein the calculated speed is calculated from:
  - (i) a time difference between the time associated with the transaction and the time associated with the pre-transaction location of the mobile phone;
  - (ii) a distance between the transaction location and the pre-transaction location of the mobile phone; and
  - (iii) the speed required to travel the distance within the time difference;
  or
- (E) allowing the transaction if the calculated speed is not greater than the predetermined value.

16. The method of claim 15, further comprising the step of requesting the user's authorization to be located via the mobile phone, wherein such user authorization is provided prior to the transaction, and wherein said pre-transaction location of the mobile phone is received from the mobile phone.

17. The method of claim 16, wherein said identity is entered via said mobile phone.

18. The method of claim 17, wherein said successful verification comprises:
- (i) sending to the mobile phone a message comprising a random number, and
- (ii) receiving from the mobile phone a message comprising said random number;

wherein said identity is a credit card number.

19. The method of claim 16, wherein the time associated with said pre-transaction location is within a predetermined time period, and wherein the location associated with the transaction is a point-of-sale location.

20. The method of claim 16, further comprising the steps of:
- (F) checking if said pre-transaction location has not been updated within a predetermine time period;
- (G) receiving another mobile phone location if said pre-transaction location has not been updated within a predetermined time period, wherein said another mobile phone location is from a time period after the pre-transaction location; and either
- (H) preventing the transaction based on the results of a calculation where a calculated speed is greater than a predetermined value, wherein the calculated speed is calculated from:
  - (i) a time difference between the time associated with the transaction and the time associated with said another mobile phone location;
  - (ii) a distance between the transaction location and said another mobile phone location; and
  - (iii) the speed required to travel the distance between the transaction location and said another mobile phone location in the time difference between the time associated with the transaction and the time associated with the another mobile phone location;
  or
- (I) allowing the transaction based on the results of the calculation if the calculated speed is not greater than the predetermined value.

* * * * *

UNITED STATES PATENT AND TRADEMARK OFFICE
CERTIFICATE OF CORRECTION

| | | |
|---|---|---|
| PATENT NO. | : 11,818,287 B2 | Page 1 of 1 |
| APPLICATION NO. | : 17/592528 | |
| DATED | : July 9, 2024 | |
| INVENTOR(S) | : Guy Hefetz | |

It is certified that error appears in the above-identified patent and that said Letters Patent is hereby corrected as shown below:

In the Claims

Column 35, Line 46: before "pre-transaction location", insert -- cached --

Column 37, Line 2: before "calculation", insert -- a --

Column 37, Line 15: before "location, wherein", insert -- pre-transaction --

Column 37, Line 15: before "location is identified", insert -- pre-transaction --

Column 37, Line 21: before "calculation", insert -- a --

Column 37, Line 48: before "time and location", insert -- a --

Column 38, Line 59: after "calculation", insert -- in step (H) --

Signed and Sealed this
Sixth Day of August, 2024

Katherine Kelly Vidal
*Director of the United States Patent and Trademark Office*